US011601273B2

(12) United States Patent
Gargiulo

(10) Patent No.: US 11,601,273 B2
(45) Date of Patent: *Mar. 7, 2023

(54) SYSTEMS, METHODS, AND COMPUTER PROGRAM PRODUCTS FOR INTERFACING MULTIPLE SERVICE PROVIDER TRUSTED SERVICE MANAGERS AND SECURE ELEMENTS

(71) Applicant: Google LLC, Mountain View, CA (US)

(72) Inventor: Michael J. Gargiulo, Corinth, TX (US)

(73) Assignee: GOOGLE LLC, Mountain View, CA (US)

( * ) Notice: Subject to any disclaimer, the term of this patent is extended or adjusted under 35 U.S.C. 154(b) by 125 days.

This patent is subject to a terminal disclaimer.

(21) Appl. No.: 17/176,001

(22) Filed: Feb. 15, 2021

(65) Prior Publication Data

US 2021/0167961 A1     Jun. 3, 2021

Related U.S. Application Data

(60) Continuation of application No. 16/054,264, filed on Aug. 3, 2018, now Pat. No. 10,924,279, which is a
(Continued)

(51) Int. Cl.
*H04L 9/32*     (2006.01)
*H04L 67/10*     (2022.01)
(Continued)

(52) U.S. Cl.
CPC ............... *H04L 9/321* (2013.01); *G06F 8/61* (2013.01); *H04L 9/00* (2013.01); *H04L 67/10* (2013.01);
(Continued)

(58) Field of Classification Search
CPC ......... H04L 65/60; H04L 12/00; H04L 65/00; H04L 65/403; H04L 65/764;
(Continued)

(56) References Cited

U.S. PATENT DOCUMENTS 5,221,838 A    6/1993   Gutman et al.
5,590,038 A    12/1996   Pitroda
(Continued)

FOREIGN PATENT DOCUMENTS

CA     2 381 614 A1    3/2001
CN     101878492 A    11/2010
(Continued)

OTHER PUBLICATIONS

Aconyte Smart Solutions, "Mobile Application Management", XP055050399, May 1, 2012, 6 pages.
(Continued)

*Primary Examiner* — Kristie D Shingles
(74) *Attorney, Agent, or Firm* — Dority & Manning, P.A.

(57) ABSTRACT

System, methods, and computer program products are provided for interfacing between one of a plurality of service provider (SP) trusted service managers (TSM) and one of a plurality of secure elements (SE). A first request to renew a service is received from an SP system over a communications network. The first request includes a service qualifier associated with the service. A secure element corresponding to the service qualifier is determined. A second request to delete data associated with the service qualifier from the secure element is transmitted to the secure element. A third request to install an application on the secure element is transmitted to the secure element. A fourth request to activate the application on the secure element is transmitted to the secure element.

20 Claims, 10 Drawing Sheets

Related U.S. Application Data continuation of application No. 15/280,104, filed on Sep. 29, 2016, now Pat. No. 10,057,773, which is a division of application No. 14/029,463, filed on Sep. 17, 2013, now Pat. No. 9,479,571.

(60) Provisional application No. 61/702,653, filed on Sep. 18, 2012.

(51) Int. Cl.

| | | |
|---|---|---|
| *H04W 4/60* | (2018.01) | |
| *H04W 12/30* | (2021.01) | |
| *H04W 12/40* | (2021.01) | |
| *H04W 12/086* | (2021.01) | |
| *H04L 9/00* | (2022.01) | |
| *H04W 4/50* | (2018.01) | |
| *H04W 4/80* | (2018.01) | |
| *G06F 8/61* | (2018.01) | |
| *H04L 67/00* | (2022.01) | |
| *H04W 8/18* | (2009.01) | |

(52) U.S. Cl.
CPC ............... *H04L 67/34* (2013.01); *H04W 4/50* (2018.02); *H04W 4/60* (2018.02); *H04W 4/80* (2018.02); *H04W 8/18* (2013.01); *H04W 12/086* (2021.01); *H04W 12/35* (2021.01); *H04W 12/40* (2021.01); *H04L 2209/80* (2013.01)

(58) Field of Classification Search
CPC . H04L 65/765; H04L 67/1059; H04L 67/141; H04L 67/34; H04L 67/131; H04L 9/321; H04L 9/00; H04L 67/10; G06F 3/165; G06F 8/61; H04N 21/00; H04W 4/50; H04W 4/60; H04W 4/80; H04W 8/18
See application file for complete search history.

(56) References Cited

U.S. PATENT DOCUMENTS

| | | | |
|---|---|---|---|
| 5,640,002 | A | 6/1997 | Ruppert et al. |
| 5,748,740 | A | 5/1998 | Curry et al. |
| 5,805,702 | A | 9/1998 | Curry et al. |
| 5,883,810 | A | 3/1999 | Franklin et al. |
| 5,884,271 | A | 3/1999 | Pitroda |
| 5,901,303 | A | 5/1999 | Chew |
| 5,940,510 | A | 8/1999 | Curry et al. |
| 5,949,880 | A | 9/1999 | Curry et al. |
| 6,000,832 | A | 12/1999 | Franklin et al. |
| 6,005,942 | A | 12/1999 | Chan et al. |
| 6,073,840 | A | 6/2000 | Marion |
| 6,105,013 | A | 8/2000 | Curry et al. |
| 6,116,505 | A | 9/2000 | Withrow |
| 6,131,811 | A | 10/2000 | Gangi |
| 6,148,192 | A | 11/2000 | Ahvenainen |
| 6,233,683 | B1 | 5/2001 | Chan et al. |
| 6,237,095 | B1 | 5/2001 | Curry et al. |
| 6,422,464 | B1 | 7/2002 | Terranova |
| 6,587,835 | B1 | 7/2003 | Treyz et al. |
| 6,601,759 | B2 | 8/2003 | Fife et al. |
| 6,671,358 | B1 | 12/2003 | Seidman et al. |
| 6,732,081 | B2 | 5/2004 | Nicholson |
| 6,769,607 | B1 | 8/2004 | Pitroda et al. |
| 6,786,400 | B1 | 9/2004 | Bucci |
| 6,813,609 | B2 | 11/2004 | Wilson |
| 6,837,436 | B2 | 1/2005 | Swartz et al. |
| 6,879,965 | B2 | 4/2005 | Fung et al. |
| 6,912,398 | B1 | 6/2005 | Domnitz |
| 6,925,439 | B1 | 8/2005 | Pitroda |
| 7,083,094 | B2 | 8/2006 | Cooper |
| 7,110,792 | B2 | 9/2006 | Rosenberg |
| 7,127,236 | B2 | 10/2006 | Khan et al. |
| 7,155,405 | B2 | 12/2006 | Petrovich |
| 7,194,422 | B1 | 3/2007 | St. John Killick |
| 7,216,109 | B1 | 5/2007 | Donner |
| 7,249,112 | B2 | 7/2007 | Berardi et al. |
| 7,286,818 | B2 | 10/2007 | Rosenberg |
| 7,298,271 | B2 | 11/2007 | Sprogis |
| 7,308,426 | B1 | 12/2007 | Pitroda |
| 7,330,714 | B2 | 2/2008 | Rosenberg |
| 7,349,885 | B2 | 3/2008 | Gangi |
| 7,363,265 | B2 | 4/2008 | Horgan |
| 7,401,731 | B1 | 7/2008 | Pletz et al. |
| 7,469,151 | B2 | 12/2008 | Khan et al. |
| 7,469,381 | B2 | 12/2008 | Ording |
| 7,483,858 | B2 | 1/2009 | Foran et al. |
| 7,494,055 | B2 | 2/2009 | Fernandes et al. |
| 7,529,563 | B1 | 5/2009 | Pitroda |
| 7,571,139 | B1 | 8/2009 | Giordano et al. |
| 7,581,678 | B2 | 9/2009 | Narendra et al. |
| 7,613,628 | B2 | 11/2009 | Ariff et al. |
| 7,631,810 | B2 | 12/2009 | Liu et al. |
| 7,685,037 | B2 | 3/2010 | Reiners et al. |
| 7,693,752 | B2 | 4/2010 | Jaramillo |
| 7,702,578 | B2 | 4/2010 | Fung et al. |
| 7,708,198 | B2 | 5/2010 | Gangi |
| 7,712,658 | B2 | 5/2010 | Gangi |
| 7,775,430 | B2 | 8/2010 | Lin |
| 7,802,264 | B2 | 9/2010 | Robertson et al. |
| 7,805,615 | B2 | 9/2010 | Narendra et al. |
| 7,809,652 | B2 | 10/2010 | Dixon et al. |
| 7,818,727 | B2 | 10/2010 | Wilkinson et al. |
| 7,828,214 | B2 | 11/2010 | Narendra et al. |
| 7,856,377 | B2 | 12/2010 | Cohagan et al. |
| 7,864,163 | B2 | 1/2011 | Ording et al. |
| 7,865,414 | B2 | 1/2011 | Fung et al. |
| 7,890,422 | B1 | 2/2011 | Hirka et al. |
| 7,922,083 | B2 | 4/2011 | Harrison et al. |
| 7,942,337 | B2 | 5/2011 | Jain |
| 7,954,715 | B2 | 6/2011 | Narendra et al. |
| 7,954,716 | B2 | 6/2011 | Narendra et al. |
| 7,954,717 | B2 | 6/2011 | Narendra et al. |
| 7,961,101 | B2 | 6/2011 | Narendra et al. |
| 7,967,215 | B2 | 6/2011 | Kumar et al. |
| 7,991,158 | B2 | 8/2011 | Narendra et al. |
| 7,996,288 | B1 | 8/2011 | Stolfo |
| 8,060,449 | B1 | 11/2011 | Zhu |
| 8,069,121 | B2 | 11/2011 | Goodrich et al. |
| 8,072,331 | B2 | 12/2011 | Narendra et al. |
| 8,083,145 | B2 | 12/2011 | Narendra et al. |
| 8,091,786 | B2 | 1/2012 | Narendra et al. |
| 8,131,645 | B2 | 3/2012 | Lin et al. |
| 8,140,418 | B1 | 3/2012 | Casey et al. |
| 8,171,525 | B1 | 5/2012 | Pelly et al. |
| 8,196,131 | B1 | 6/2012 | von Behren et al. |
| 8,326,758 | B2 | 12/2012 | Bennett |
| 8,392,328 | B2 | 3/2013 | Shah et al. |
| 8,396,808 | B2 | 3/2013 | Greenspan |
| 8,429,046 | B2 | 4/2013 | Pitroda |
| 8,776,189 | B2 | 7/2014 | Jain |
| 8,875,228 | B2 | 10/2014 | Gargiulo et al. |
| 9,104,887 | B2 | 8/2015 | Gargiulo |
| 9,323,945 | B2 | 4/2016 | Gargiulo et al. |
| 9,479,571 | B2 | 10/2016 | Gargiulo |
| 9,544,759 | B2 | 1/2017 | Gargiulo |
| 9,572,025 | B2 | 2/2017 | Arvidsson et al. |
| 10,368,230 | B2 | 7/2019 | Namiranian |
| 10,924,279 | B2 * | 2/2021 | Gargiulo ............... H04L 9/00 |
| 2002/0040936 | A1 | 4/2002 | Wentker et al. |
| 2002/0049631 | A1 | 4/2002 | Williams |
| 2002/0082921 | A1 | 6/2002 | Rankin |
| 2002/0152156 | A1 | 10/2002 | Tyson-Quah |
| 2002/0174025 | A1 | 11/2002 | Hind et al. |
| 2002/0179703 | A1 | 12/2002 | Allen |
| 2003/0009382 | A1 | 1/2003 | D'Arbeloff et al. |
| 2003/0061157 | A1 | 3/2003 | Hirka et al. |
| 2003/0083042 | A1 | 5/2003 | Abuhamdeh |
| 2003/0115126 | A1 | 6/2003 | Pitroda |
| 2003/0126094 | A1 | 7/2003 | Fisher et al. |
| 2003/0132298 | A1 | 7/2003 | Swartz et al. |
| 2003/0200489 | A1 | 10/2003 | Hars |

(56) References Cited

U.S. PATENT DOCUMENTS

| | | |
|---|---|---|
| 2004/0024703 A1 | 2/2004 | Roskind |
| 2004/0073519 A1 | 4/2004 | Fast |
| 2004/0143550 A1 | 7/2004 | Creamer et al. |
| 2004/0148255 A1 | 7/2004 | Beck et al. |
| 2004/0166839 A1 | 8/2004 | Okkonen et al. |
| 2004/0186768 A1 | 9/2004 | Wakim et al. |
| 2005/0004866 A1 | 1/2005 | Bonalle et al. |
| 2005/0171898 A1 | 8/2005 | Bishop et al. |
| 2005/0186954 A1 | 8/2005 | Kenney |
| 2005/0191968 A1 | 9/2005 | Tabayashi et al. |
| 2005/0199714 A1 | 9/2005 | Brandt et al. |
| 2005/0222961 A1 | 10/2005 | Staib et al. |
| 2005/0234769 A1 | 10/2005 | Jain et al. |
| 2005/0247777 A1 | 11/2005 | Pitroda |
| 2005/0251446 A1 | 11/2005 | Jiang et al. |
| 2006/0107217 A1 | 5/2006 | Lu et al. |
| 2006/0149665 A1 | 7/2006 | Weksler |
| 2006/0178937 A1 | 8/2006 | Rau et al. |
| 2006/0287004 A1 | 12/2006 | Fuqua |
| 2007/0014407 A1 | 1/2007 | Narendra et al. |
| 2007/0014408 A1 | 1/2007 | Narendra et al. |
| 2007/0095892 A1 | 5/2007 | Lyons et al. |
| 2007/0170247 A1 | 7/2007 | Friedman |
| 2007/0198432 A1 | 8/2007 | Pitroda et al. |
| 2007/0265961 A1 | 11/2007 | Shah et al. |
| 2007/0274524 A1 | 11/2007 | Ksontini et al. |
| 2007/0288745 A1 | 12/2007 | Kwan et al. |
| 2007/0288747 A1 | 12/2007 | Kwan et al. |
| 2008/0015988 A1 | 1/2008 | Brown et al. |
| 2008/0306849 A1 | 12/2008 | Johnson et al. |
| 2008/0319887 A1 | 12/2008 | Pizzi et al. |
| 2009/0037333 A1 | 2/2009 | Flitcroft et al. |
| 2009/0070861 A1 | 3/2009 | Jain |
| 2009/0098854 A1 | 4/2009 | Park et al. |
| 2009/0108064 A1 | 4/2009 | Fernandes et al. |
| 2009/0149192 A1 | 6/2009 | Vargas et al. |
| 2009/0164322 A1 | 6/2009 | Khan et al. |
| 2009/0172678 A1 | 7/2009 | Branca, Jr. et al. |
| 2009/0192935 A1 | 7/2009 | Griffin et al. |
| 2009/0240620 A1 | 9/2009 | Kendrick et al. |
| 2009/0313143 A1 | 12/2009 | Darensbourg et al. |
| 2010/0036770 A1 | 2/2010 | Fourez et al. |
| 2010/0070649 A1 | 3/2010 | Ng |
| 2010/0082481 A1 | 4/2010 | Lin et al. |
| 2010/0094753 A1 | 4/2010 | Carlson et al. |
| 2010/0114739 A1 | 5/2010 | Johnston |
| 2010/0138518 A1 | 6/2010 | Aiglstorfer et al. |
| 2010/0174595 A1 | 7/2010 | Aaltonen et al. |
| 2010/0188975 A1 | 7/2010 | Raleigh |
| 2010/0198728 A1 | 8/2010 | Aabye et al. |
| 2010/0211445 A1 | 8/2010 | Bodington |
| 2010/0241494 A1 | 9/2010 | Kumar et al. |
| 2010/0257040 A1 | 10/2010 | Hunt |
| 2010/0275269 A1 | 10/2010 | Vilmos et al. |
| 2010/0291896 A1 | 11/2010 | Corda |
| 2010/0291904 A1 | 11/2010 | Musfeldt et al. |
| 2010/0312636 A1 | 12/2010 | Coulter et al. |
| 2011/0006113 A1 | 1/2011 | Uchikura |
| 2011/0029786 A1 | 2/2011 | Raffard et al. |
| 2011/0034160 A1 | 2/2011 | Corda et al. |
| 2011/0055047 A1 | 3/2011 | Fox |
| 2011/0073663 A1 | 3/2011 | Narendra et al. |
| 2011/0087610 A1 | 4/2011 | Batada et al. |
| 2011/0127324 A1 | 6/2011 | Hirka et al. |
| 2011/0131133 A1 | 6/2011 | Hirka et al. |
| 2011/0145152 A1 | 6/2011 | Mccown |
| 2011/0161188 A1 | 6/2011 | Roberts |
| 2011/0171996 A1 | 7/2011 | Narendra et al. |
| 2011/0180598 A1 | 7/2011 | Morgan et al. |
| 2011/0191149 A1 | 8/2011 | Blackhurst et al. |
| 2011/0218849 A1 | 9/2011 | Rutigliano et al. |
| 2011/0223972 A1 | 9/2011 | Narendra et al. |
| 2011/0231238 A1 | 9/2011 | Khan et al. |
| 2011/0238510 A1 | 9/2011 | Rowen et al. |
| 2011/0244796 A1 | 10/2011 | Khan et al. |
| 2011/0269438 A1 | 11/2011 | Narendra et al. |
| 2011/0271044 A1 | 11/2011 | Narendra et al. |
| 2011/0272468 A1 | 11/2011 | Narendra et al. |
| 2011/0272469 A1 | 11/2011 | Narendra et al. |
| 2011/0282780 A1 | 11/2011 | French et al. |
| 2011/0289001 A1 | 11/2011 | Bishop et al. |
| 2011/0320345 A1 | 12/2011 | Taveau et al. |
| 2012/0047237 A1 | 2/2012 | Arvidsson et al. |
| 2012/0064828 A1 | 3/2012 | Khan et al. |
| 2012/0089520 A1 | 4/2012 | Mardikar |
| 2012/0109681 A1 | 5/2012 | Chapman et al. |
| 2012/0109764 A1 | 5/2012 | Martin et al. |
| 2012/0171992 A1 | 7/2012 | Cheong et al. |
| 2012/0197773 A1 | 8/2012 | Grigg et al. |
| 2012/0231736 A1 | 9/2012 | Amiel et al. |
| 2012/0259768 A1 | 10/2012 | Mukherjee |
| 2012/0267432 A1 | 10/2012 | Kuttuva |
| 2012/0304255 A1 | 11/2012 | Carnes |
| 2012/0323664 A1 | 12/2012 | Klems |
| 2013/0024289 A1 | 1/2013 | Cueli et al. |
| 2013/0060618 A1 | 3/2013 | Barton et al. |
| 2013/0080227 A1 | 3/2013 | Maskatia et al. |
| 2013/0111546 A1 | 5/2013 | Gargiulo et al. |
| 2013/0111599 A1 | 5/2013 | Gargiulo |
| 2013/0139230 A1 | 5/2013 | Koh et al. |
| 2013/0151400 A1 | 6/2013 | Makhotin et al. |
| 2013/0262302 A1 | 10/2013 | Letlow et al. |
| 2014/0006194 A1 | 1/2014 | Xie et al. |
| 2014/0040126 A1 | 2/2014 | Andrews et al. |
| 2014/0082056 A1 | 3/2014 | Gargiulo |
| 2014/0164475 A1 | 6/2014 | Gargiulo |
| 2015/0007345 A1 | 1/2015 | Gargiulo et al. |
| 2015/0310223 A1 | 10/2015 | Gargiulo |
| 2016/0196450 A1 | 7/2016 | Gargiulo et al. |
| 2017/0019792 A1 | 1/2017 | Gargiulo |
| 2017/0374550 A1 | 12/2017 | Auer |
| 2018/0091538 A1 | 3/2018 | Narayanan et al. |

FOREIGN PATENT DOCUMENTS

| | | |
|---|---|---|
| CN | 102298528 A | 12/2011 |
| EP | 1 153 375 B1 | 1/2003 |
| EP | 0 766 852 B1 | 8/2004 |
| EP | 1 412 890 A4 | 11/2004 |
| EP | 1 477 943 A2 | 11/2004 |
| EP | 1 222 503 A4 | 12/2004 |
| EP | 2 043 060 A1 | 4/2009 |
| EP | 2 048 591 A1 | 4/2009 |
| EP | 2 306 684 A1 | 4/2011 |
| EP | 2 341 659 A1 | 7/2011 |
| EP | 2 388 968 A1 | 11/2011 |
| EP | 2 400 673 A2 | 12/2011 |
| JP | 2004102784 A | 4/2004 |
| JP | 2006-119901 A | 5/2006 |
| JP | 2007-511122 A | 4/2007 |
| JP | 2007-288494 A | 11/2007 |
| JP | 2008-282356 A | 11/2008 |
| JP | 2010-501953 A | 1/2010 |
| JP | 2010-534879 A | 11/2010 |
| JP | 2011-508466 A | 3/2011 |
| JP | 2012-507220 A | 3/2012 |
| JP | 2012-518350 A | 8/2012 |
| JP | 2012-518360 A | 8/2012 |
| KR | 10-2008-0056291 A | 6/2008 |
| KR | 10-2008-0096722 A | 11/2008 |
| KR | 10-2012-0046376 A | 5/2012 |
| WO | WO 01/18629 A3 | 5/2001 |
| WO | WO 03/012717 A1 | 2/2003 |
| WO | WO 2008/028989 A1 | 3/2008 |
| WO | WO 2009/013700 A2 | 1/2009 |
| WO | WO 2009/060393 A2 | 5/2009 |
| WO | WO 2009/144612 A1 | 12/2009 |
| WO | WO 2010/050652 A1 | 5/2010 |
| WO | WO 2010/084081 A1 | 7/2010 |
| WO | WO 2010/120222 A1 | 10/2010 |
| WO | WO 2012/042262 A1 | 4/2012 |
| WO | WO 2012/091349 A2 | 7/2012 |
| WO | WO 2013/063353 A1 | 5/2013 |
| WO | WO 2013/066620 A1 | 5/2013 |

(56) References Cited

FOREIGN PATENT DOCUMENTS

| WO | WO 2013/066621 A1 | 5/2013 |
|---|---|---|
| WO | WO 2014/022383 A1 | 2/2014 |
| WO | WO 2014/047069 A1 | 3/2014 |

OTHER PUBLICATIONS

Campbell, "Lewinsky Scandal Ends As Clinton is Disbarred", Retrieved from: https://www.theguardian.com/world/2001 /oct/02/ duncancampbell, mailed on Oct. 1, 2001, 2 pages.
European Search Report in EP 14800349.4, dated Dec. 15, 2016, 9 pages.
Finextra Research, "Aconite launches Mobile Application Management", Oct. 26, 2011, XP055050391, 2 pages.
Global Platform "Messaging Specification for Management of Mobile-NFC Services", Global Platform System, Version 1.0, Feb. 2011, 62 pages.
Global Platform Inc., "Global Platform—Card Specification", Version 2.2, Mar. 2006, 375 pages.
Global Platform Inc., "Global Platform Card Contactless Services Card Specification v2.2-Amendment C", Version 1.0, Feb. 2010, 77 pages.
Global Platform Inc., "Global Platform's Proposition for NFC Mobile: Secure Element Management and Messaging", GlobalPlatform Inc., Apr. 2009, 36 pages.
Global Platform Inc., "Global Platform-Card Specification," Global Platform Inc., Version 2.1.1, Mar. 2003, 237 pages.
International Preliminary Report on Patentability and Written Opinion from PCT/US2012/060442, dated May 15, 2014, 18 pages.
International Preliminary Report on Patentability and Written Opinion from PCT/US2012/060445, dated May 15, 2014, 14 pages.
International Preliminary Report on Patentability for PCT/US2013/052708, dated Feb. 12, 2015, 7 pages.
International Preliminary Report on Patentability from PCT/US2013/060189, dated Apr. 2, 2015, 14 pages.
International Preliminary Report on Patentability from PCT/US2014/016922, dated Dec. 3, 2015, 7 pages.
Interational Search Report and Written Opinion from PCT/US2013/035406, dated Jul. 19, 2013, 8 pages.
International Search Report and Written Opinion from PCT/US2012/060442, dated Jan. 28, 2013, 11 pages.
International Search Report and Written Opinion from PCT/US2012/060445, dated Jan. 28, 2013, 10 pages.
International Search Report and Written Opinion from PCT/US2013/060189, dated Nov. 22, 2013, 9 pages.
International Search Report and Written Opinion from PCT/US2013/028697, dated May 23, 2013, 8 pages.
International Search Report and Written Opinion from PCT/US2013/033467, dated Jul. 4, 2013, 8 pages.
International Search Report and Written Opinion from PCT/US2014/016922, dated Jun. 24, 2014, 8 pages.
International Search Report and Written Opinion PCT/US2013/052708, dated Nov. 19, 2013, 10 pages.
International Search Report from EP 13825094.9, dated Dec. 9, 2015, 8 pages.
International Search Report issued for EP 18185200.5, dated Aug. 20, 2018, 5 pages.
Office Action from U.S. Appl. No. 13/759,003, dated Jun. 6, 2013, 24 pages.
Office Action from AU 2012332956, dated Apr. 20, 2015, 3 pages.
Office Action from AU 2013318245, dated Aug. 14, 2015, 3 pages.
Office Action from AU 2013318245, dated Jul. 8, 2015, 3 pages.
Office Action from AU 2015234304 dated Nov. 17, 2015, 3 pages.
Office Action from AU 2016201055, dated Mar. 6, 2017, 2 pages.
Office Action from AU 2016203535 dated Mar. 15, 2017, 2 pages.
Office Action from CA 2854276, dated Aug. 26, 2015, 4 pages.
Office Action from CA 2854277, dated Nov. 21, 2014, 5 pages.
Office Action from CN 201280057986.5, dated Jun. 3, 2016, 9 pages.
Office Action from CN 201280059706.4, dated Jun. 24, 2016, 8 pages.
Office Action from CN 201380031055.2, dated Jan. 23, 2017, 5 pages.
Office Action from CN 201380031055.2, dated Jul. 4, 2016, 22 pages.
Office Action from CN 201380050257.1 dated Mar. 1, 2017, 17 pages.
Office Action from CN 201480035608.6, dated May 7, 2019, 13 pages.
Office Action from CN 201480035608.6, dated Aug. 14, 12 pages.
Office Action from CN 201480035608.6, dated Feb. 11, 2018, 9 pages.
Office Action from CN 201480035608.6, dated Feb. 3, 2019, 14 pages.
Office Action from EP 13773932.2, dated Sep. 14, 2017, 7 pages.
Office Action from EP 18185200.5, dated Jun. 26, 2019, 7 pages.
Office Action from JP 2014-538837, dated Apr. 27, 2015, 23 pages.
Office Action from JP 2014-538837, dated May 29, 2017, 24 pages.
Office Action from JP 2014-538837, dated Oct. 5, 2015, 12 pages.
Office Action from JP 2014-538837, dated Sep. 25, 2017, 6 pages.
Office Action from JP 2015-520725, dated Aug. 1, 2016, 8 pages.
Office Action from JP 2015-520725, dated Feb. 24, 2016, 8 pages.
Office Action from JP 2016-095171, dated Jul. 31, 2017, 8 pages.
Office Action from JP 2016-252937, dated Feb. 5, 2018, 11 pages.
Office Action from JP 2018-191653, dated Jul. 1, 2019, 9 pages.
Office Action from KR 10-2014-7014377, dated Sep. 24, 2014, 6 pages.
Office Action from KR 10-2014-7035460, dated Jul. 30, 2015, 12 pages.
Office Action from KR 10-2014-7035460, dated Mar. 31, 2016, 7 pages.
Office Action from KR 10-2014-7035460, dated May 31, 2016, 6 pages.
Office Action from KR 10-2016-7023397, dated Dec. 21, 2016, 17pages.
Office Action from MX/a/2014/005180, dated Oct. 19, 2015, 3 pages.
Office Action from MX/a/2014/005181, dated May 20, 2016, 4 pages.
Office Action from MX/a/2014/015189, dated Feb. 15, 2016, 5 pages
Office Action from U.S. Appl. No. 13/545,702, dated Jun. 17, 2013, 14 pages.
Office Action from U.S. 13/653,145, dated Jun. 17, 2013, 7 pages.
Office Action from U.S. 13/653,145, dated May 2, 2014, 9 pages.
Office Action from U.S. Appl. No. 13/653,145, dated Oct. 25, 2013, 8 pages.
Office Action from U.S. Appl. No. 13/653,160 filed Oct. 16, 2012, dated Oct. 21, 2014, 10 pages.
Office Action from U.S. Appl. No. 13/658,783, filed Oct. 23, 2012, dated Jul. 11, 2013, 17 pages.
Office Action from U.S. 13/658,783 filed Oct. 23, 2012, dated Mar. 5, 2013, 14 pages.
Office Action from U.S. Appl. No. 13/717,295, dated Feb. 28, 2013, 13 pages.
Office Action from U.S. Appl. No. 13/731,090, dated Apr. 3, 2015, 15 pages.
Office Action from U.S. Appl. No. 13/731,090, dated Apr. 5, 2017, 14 pages.
Office Action from U.S. Appl. No. 13/731,090, dated Dec. 13, 2016, 14 pages.
Office Action from U.S. Appl. No. 13/731,090, dated Nov. 3, 2015, 14 pages.
Office Action from U.S. Appl. No. 13/784,808 filed Mar. 4, 2013, dated Jul. 15, 2013, 20 pages.
Office Action from U.S. Appl. No. 13/802,705 filed Mar. 13, 2013, dated Jul. 18, 2013, 11 pages.
Office Action from U.S. Appl. No. 14/029,463 filed Sep. 17, 2013, dated Dec. 3, 2015, 8 pages.
Office Action from U.S. 14/183,137, dated Nov. 4, 2015, 10 pages.
Office Action from U.S. Appl. No. 14/487,433, dated May 8, 2015, 14 pages.

(56) References Cited

OTHER PUBLICATIONS

Office Action from U.S. Appl. No. 14/487,433, dated Aug. 17, 2015, 19 pages.
Office Action from U.S. 15/073,064, dated Apr. 3, 2017, 17 pages.
Office Action from U.S. Appl. No. 15/073,064, dated Feb. 15, 2017, 10 pages.
Office Action from U.S. Appl. No. 15/073,064, dated Jul. 12, 2017, 13 pages.
Office Action from U.S. Appl. No. 15/280,104, dated Feb. 2, 2018, 9 pages.
Office Action from U.S. Appl. No. 15/280,104, dated Sep. 20, 2017, 8 pages.
Quittner, "PayPal Seeks to Cut Out Card Companies with New Plastic", PayPal Inc., Published in Bank Technology News, Oct. 18, 2011, 2 pages.
Softbank Mobile "NFC Demonstration Experiment in Android installed Smart phones Commercialization Achieved by Increasing the Degree of Completion of Applications", CardWave, Japan, eCURE Co., Ltd, vol. 25, No. 5, Jan. 25, 2011, 4 pages (Japanese copy only).
U.S. Appl. No. 13/653,145, filed Oct. 16, 2012.
U.S. Appl. No. 14/029,463, filed Sep. 17, 2013.
U.S. Appl. No. 14/487,433, filed Sep. 16, 2014.
U.S. Appl. No. 15/073,064, filed Mar. 17, 2016.
U.S. Appl. No. 15/280,104, filed Sep. 29, 2016.
Wikipedia, "Disbarment", from Wikipedia, the free encyclopedia, Dec. 24, 2010, 4 pages.
Yliuntinen, "3rd Party TSM Management of SIM Cards", [online], Sep. 12, 2011, 4 pages.

\* cited by examiner

SYSTEMS, METHODS, AND COMPUTER PROGRAM PRODUCTS FOR INTERFACING MULTIPLE SERVICE PROVIDER TRUSTED SERVICE MANAGERS AND SECURE ELEMENTS

CROSS REFERENCE TO RELATED APPLICATION

This application is a continuation of U.S. application Ser. No. 16/054,264, filed on Aug. 3, 2018, which is a continuation of U.S. application Ser. No. 15/280,104, filed on Sep. 29, 2016, which is a divisional of U.S. application Ser. No. 14/029,463, filed on Sep. 17, 2013, which claims priority to U.S. Provisional Patent Application No. 61/702,653, filed Sep. 18, 2012. Applicant claims priority to and the benefit of each of such applications and incorporates all such applications herein by reference in their entirety.

BACKGROUND OF THE INVENTION

Field of the Invention

The present invention relates to interfacing between service providers and secure elements, and more particularly to systems, methods, and computer program products for interfacing between service provider trusted service managers and secure elements.

Related Art

A service provider (SP) is a company, organization, entity, or the like, that provides services to customers or consumers. Examples of service providers include account-issuing entities such as merchants, card associations, banks, marketing companies, and transit authorities. A service may be an activity, capability, functionality, work, or use that is permitted or provided by a service provider such as a payment service, a gift, offer or loyalty service, transit pass service, and the like.

In a mobile environment that involves contactless transactions between a mobile device and a service provider, information relating to the accounts and applications issued by the service providers must be downloaded onto mobile devices in order to enable them to perform the contactless transactions.

A trusted service manager (TSM) is typically an independent entity serving mobile network operators (MNOs) and account-issuing service providers by provisioning applications, such as contactless applications associated with the service providers, to mobile devices. Typical TSMs can distribute and manage the contactless applications remotely because they have access to secure elements (SEs) in a near field communication (NFC) enabled mobile device.

Security-critical applications, such as those involving payment and account credentials, require secure hardware storage and a secure execution environment. On mobile devices, this is usually handled by the secure element.

The secure element is a platform onto which applications can be installed, personalized and managed. It consists of hardware, software, interfaces, and protocols that enable the secure storage of credentials and execution of applications for payment, authentication, and other services.

A secure element may be implemented in different form factors such as a Universal Integrated Circuit Card (UICC), an embedded secure element, or NFC enablers such as a separate chip or secure device, which can be inserted into a slot on the mobile device. Typically a UICC is in the form of a subscriber identity module (SIM), which is controlled by the MNOs. An embedded secure element gives service providers the option to embed the secure element into the phone itself. One way in which secure element form factors are implemented is defined in, for example, GlobalPlatform Card Specification Versions 2.1.1 and 2.2 (hereinafter "Global Platform").

A secure element may include one or more security domains (SDs), each of which includes a collection of data, such as packages, applets, applications, and the like, that trust a common entity (i.e., are authenticated or managed using a common security key or token).

Security domains may be associated with service providers and may include service provider applets or applications such as loyalty, couponing, and credit card, and transit applications or applets.

Traditionally, service provider systems include a TSM to interconnect with a secure element on a mobile device to create a security domain on the secure element and install, provision and manage applets and applications on the secure element. Service providers must be able to provide their services to a large number of customers with different mobile devices, equipped with different secure elements, and being serviced by a variety of MNOs. As explained above, secure elements may be implemented in numerous form factors, and may contain a variety of security domains, applets and applications, all potentially configured in an extremely large number of ways. As a result, service providers are faced with the overwhelming task of providing adaptable services and solutions to a large, and often growing and changing, combination of mobile devices, MNOs, networks, secure elements and security domains.

For example, in order for a service provider to securely install a payment applet onto a customer's secure element on a mobile device, the service provider must first determine a large amount of information in order to send to and process a request on a secure element. For example, service providers using the prior art must obtain secure element information (e.g., identifiers, type, profile identifier, certification level and expiration), MNO information (e.g., type), security domain information (e.g., identifier, privileges, master key index), and the like. This information may exist in a variety of different sources (e.g., security domain, secure element, mobile device, MNO) and therefore, it is a laborious task for a service provider to retrieve, and check for parity, all of this information, requiring extensive processing.

One technical challenge in the installation, management, and provisioning of applications on secure elements is due to the limitations in typical TSMs, namely that they do not function as central intermediaries capable of processing communications between a large variety of service providers, MNOs, mobile devices, networks, secure elements and security domains. There is a need, therefore, for an improved system such as a central TSM, particularly tailored for interfacing between service providers (including service provider TSMs) and secure elements.

From the perspective of a service provider, what matters is that they can easily and securely communicate (i.e., request personalization, service activation, processing of scripts, etc.) with an intended customer's secure element, regardless of the customer's mobile device, secure element, MNO, or mobile network.

From the perspective of the customer, what matters is that the service of the service provider can be activated on and used with the customer's secure element, regardless of the customer's mobile device, secure element, MNO, or mobile network.

BRIEF DESCRIPTION

The present invention provides systems, methods, and computer program products for interfacing between one of a plurality of service provider trusted service managers and one of a plurality of secure elements.

In one embodiment, a system for interfacing between one of a plurality of service provider trusted service managers and one of a plurality of secure elements includes at least one memory and a processor communicatively coupled to the at least one memory. The processor is operable to perform the following: receive a first request to renew a service from a service provider (SP) trusted service manager (TSM) over a communications network, the first request including a service qualifier associated with the service; determine a secure element corresponding to the service qualifier; transmit to the secure element a second request to delete data associated with the service qualifier from the secure element; transmit to the secure element a third request to install an application on the secure element; and transmit to the secure element a fourth request to activate the application on the secure element.

In another embodiment, a method for interfacing between one of a plurality of service provider (SP) trusted service managers (TSM) and one of a plurality of secure elements, comprises steps of: receiving, from an SP TSM over a communications network, a first request to renew a service, the first request including a service qualifier associated with the service; determining a secure element corresponding to the service qualifier; transmitting, to the secure element, a second request to delete data associated with the service qualifier from the secure element; transmitting, to the secure element, a third request to install an application on the secure element; and transmitting, to the secure element, a fourth request to activate the application on the secure element.

In another embodiment, a non-transitory computer-readable medium has stored thereon sequences of instructions for causing one or more processors to: receive, from an SP TSM over a communications network, a first request to renew a service, the first request including a service qualifier associated with the service; determine a secure element corresponding to the service qualifier; transmit, to the secure element, a second request to delete data associated with the service qualifier from the secure element; transmit, to the secure element, a third request to install an application on the secure element; and transmit, to the secure element, a fourth request to activate the application on the secure element.

Further features and advantages of the present invention will become more apparent from the detailed description set forth below when taken in conjunction with the following drawings.

BRIEF DESCRIPTION OF THE DRAWINGS

The features and advantages of the present invention will become more apparent from the detailed description set forth below when taken in conjunction with the following drawings.

DETAILED DESCRIPTION

Overview

Figure 1:
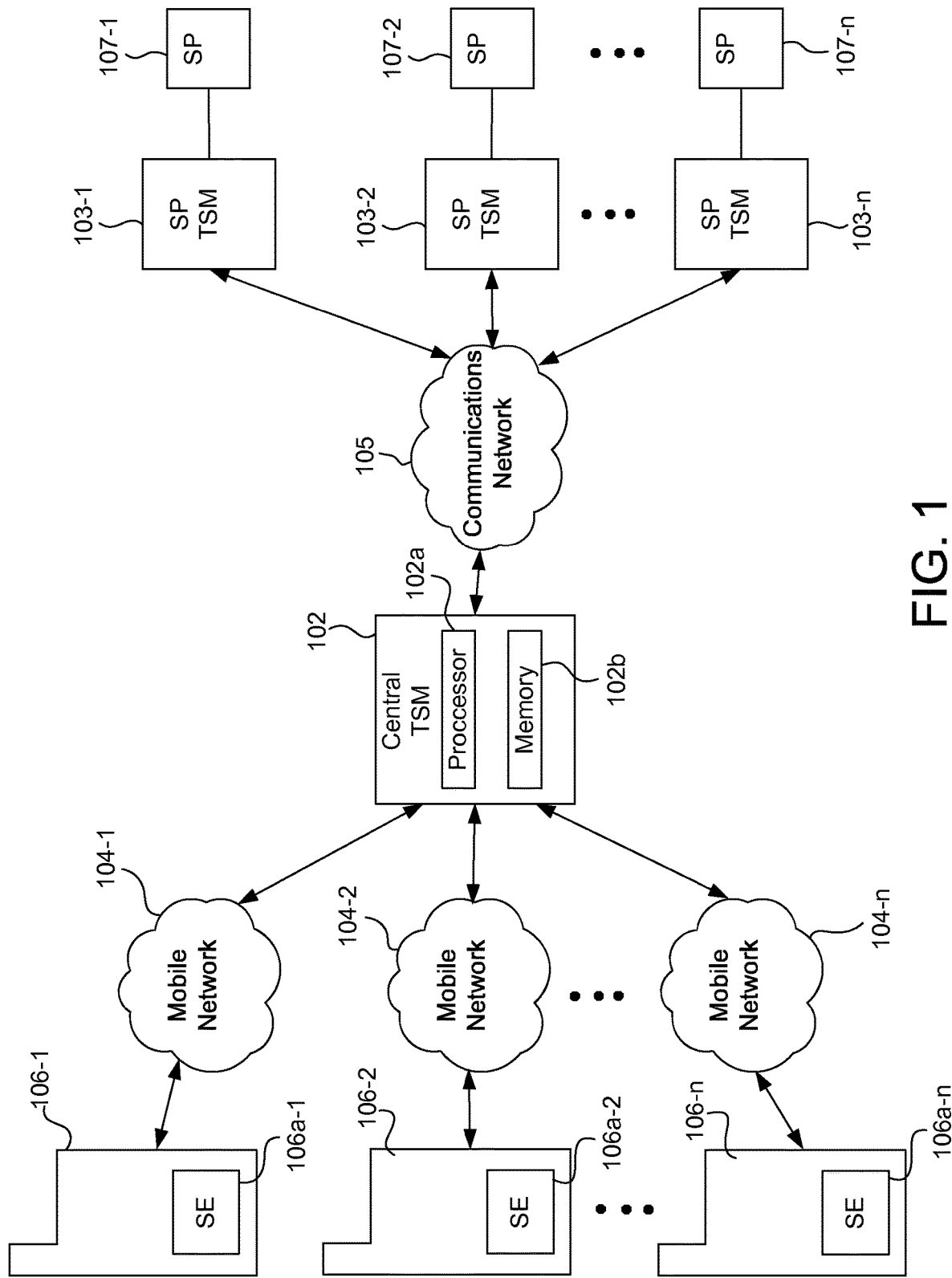
FIG. 1 is a diagram of a system for interfacing between a service provider and a secure element according to an exemplary embodiment.

The example embodiments of the invention presented herein are directed to systems, methods, and computer program products for interfacing between a service provider and a secure element. This is for convenience only, and is not intended to limit the application of the present invention. In fact, after reading the following description, it will be apparent to one skilled in the relevant art(s) how to implement the following invention in alternative embodiments, such as interfacing between a large variety and vast number of entities including TSMs, MNOs, secure elements, mobile devices, service providers, and any other systems that are capable of communicating over networks.

Generally, the exemplary embodiments described herein perform interfacing between one or more service provider systems having a mobile subscription identifier (MSI) and one or more secure elements.

A service provider system (i.e., service provider) may communicate with a central TSM in order to access or control a corresponding security domain and/or application on a secure element. In particular, the service provider, by communicating with the central TSM, may pre-personalize a secure element, personalize a service on a security domain in a secure element, or activate a service on the secure element. For example, the service provider may transmit a request to the central TSM to pre-personalize a secure element. In response, the central TSM may pre-personalize the secure element, including creating at least one service provider security domain including corresponding temporary security keys, if required, and/or instantiating an application on the secure element. Instantiation of the application includes creating an instance of an uninstantiated application.

The service provider may also transmit a request to personalize a service to the central TSM. The request may include data and scripts. The scripts may include commands to be executed by an application on a security domain corresponding to the service provider in the secure element. For example, the scripts may include commands to personalize an instantiated application, rotate keys in the corresponding security domain, and/or execute service provider commands in the service provider's security domain and/or instantiated application in the secure element. The central TSM receives the request and securely transmits the scripts and/or data in the request to the secure element. In turn, the secure element receives and executes the scripts and data.

The service provider communicates with the central TSM in order to have commands executed on the secure element. In order to do so, the service provider (i.e., SP TSM) sends a request (e.g., to pre-personalize a secure element) to the central TSM to obtain information about the secure element based on an MSI. The central TSM receives the request and queries its memory, based on the MSI, to obtain the requested information about the secure element. Once the central TSM has retrieved the secure element information corresponding to the MSI, the central TSM transmits the retrieved secure element information and the MSI to the SP TSM.

Once the service provider has identified the target secure element and its information, the service provider (i.e., SP TSM) sends a request to the central TSM, for the central TSM to establish a communication (i.e., a conversation) with the secure element. The request to establish the communication includes the retrieved secure element information and corresponding MSI, as well as information regarding applications or applets, security domains, services and scripts that will be used to process a subsequent request from the service provider. The central TSM receives the request and transmits a response to the SP TSM including a communication identifier and other attributes of the communication.

After the communication has been established, the service provider sends a request (e.g., personalize an application), including the communication identifier, intended to be executed in the secure element. The service provider initially sends the request to the central TSM. The central TSM receives the request, and based on the information in the request, establishes a connection with the secure element and transmits the request (e.g., personalize an application) to the secure element for processing. The central TSM transmits the request to the secure element over a corresponding mobile network. The corresponding mobile network is determined based on MNO information which is retrieved from the memory of the central TSM, which is based on the information in the request made by the service provider (e.g., to personalize an application). The request is processed in the secure element in accordance with the request from the service provider, based on the information in the request and the established communication.

Due to the functionality of the exemplary embodiments described herein, a service provider can efficiently and effortlessly communicate with a central TSM in order to have a variety of requests processed on a secure element with minimal processing and information required. The exemplary embodiments also provide for a central TSM arrangement that significantly reduces the time and cost requirements required for service providers to have requests (e.g., enable services) processed on a secure element.

In addition, a service provider can send a request to a secure element, via a central TSM, merely by using the MSI to communicate with a single source (i.e., the central TSM). That is, the service provider is able to process its requests with a secure element without the need to communicate with multiple intermediary sources (e.g., MNOs, TSMs).

Additionally, service provider requests are standardized such that a single type of request is communicated to the central TSM notwithstanding the type of MNO, mobile device type, secure element, and/or application. By standardizing the service provider requests, advantageously, the errors and complexities associated with the processing of multiple service provider requests are reduced. Further, service providers do not have to transmit or provide an application for installation, or provide MNO, mobile device or secure element interfaces in order to have a request processed on a secure element. Instead, the service provider can send one or more standardized requests with commands to the central TSM. As a result, the processing time and size required to execute a request are minimized.

System

FIG. 1 is a diagram of an exemplary system 100 for interfacing between service providers and secure elements over mobile networks. As shown in FIG. 1, system 100 includes SP TSMs 103-1, 103-2, ..., 103-n (collectively "103"). Each of the SP TSMs 103 corresponds to a service provider 107-1, 107-2, ..., 107-n (collectively "107"). Each SP TSM serves as an intermediary between the service providers 107 and other entities including secure elements, MNOs, and another type of TSM (referred to herein as a "central TSM").

Each of the SP TSMs 103 are communicatively coupled to central TSM 102 via a communications network 105. Communications network 105 may be a virtual private network (VPN), a network using Hypertext Transfer Protocol (HTTP) standards, or the like.

Each of the SP TSMs 103 and the central TSM 102 may also secure these communications by using security protocols such as Secure Socket Layer (SSL), Transport Layer Security (TLS), or the like. Each of the SP TSMs 103 may also communicate with central TSM 102 by using an application programming interface (API) such as a web service API.

In an exemplary embodiment, the central TSM 102 is hardware and/or software that is implemented to serve as an intermediary between the SP TSMs 103 and secure elements 106a-1, 106a-2, ..., 106a-n (collectively "106a"). Specifically, the central TSM 102 allows each of the SP TSMs 103 to, for example, request pre-personalization of a secure element (e.g., secure elements 106), generate and install new or temporary security domain keysets, personalize a payment service, and/or have a service activated. That is, the central TSM 102 manages the communications between the SP TSMs 103 and the secure elements 106a.

The central TSM 102, therefore, can communicate with a plurality of service providers 107 and SP TSMs 103, and with a plurality of secure elements 106a over a plurality of mobile networks 104-1, 104-2, . . . , 104-n (collectively "104").

In an example embodiment, the central TSM 102 includes a processor 102a and a memory 102b.

The central TSM 102 may include an enterprise service bus (ESB) (not shown). In an exemplary embodiment, the ESB is an architecture model for implementing the interactions and communications between entities (e.g., secure elements 106a, SP TSMs 103, central TSM 102).

The central TSM 102 is communicatively coupled to the secure elements 106a via corresponding mobile networks 104 used and/or managed by corresponding MNOs. Generally, the mobile networks 104 are used by MNOs to provide wireless communications services. The mobile networks 104 may be mobile phone cellular networks, radio networks, or the like. The central TSM 102 may communicate with the secure elements 106a, via the mobile networks 104, using security protocols such as Global Platform secure channel protocol, SSL, TLS, or the like.

Secure elements (e.g., secure elements 106a) are discussed in further detail below with reference to FIGS. 5-8. As shown in FIG. 1, the secure elements 106a are associated with corresponding mobile devices 106-1, 106-2, and 106-n (collectively "106"), respectively. The secure elements 106a may be communicatively coupled to one or more processors and one or more memories.

During manufacture of a secure element (e.g., secure element 106a-1), the secure element is pre-loaded with content including, for example, an MNO SD, a central SD, a wallet companion applet, a mobile wallet companion applet (WCAp), a proximity payment system environment (PPSE), and a payment package. The MNO SD is a security domain that is managed by an MNO, and includes security keys and applications. The central SD is managed by the central TSM 102. The WCAp may be used by a mobile wallet in order to conduct transactions, and the PPSE is an application that assists in the process of making contactless payment transactions.

The secure elements 106a may include security domains, code, applets, applications, and packages. The packages may include uninstantiated applets and/or applications, and may be loaded on a secure element, for example, over-the-air (OTA). Applets and/or applications on the secure element may be in uninstantiated or instantiated form, and uninstantiated applets and/or applications may be preloaded on a secure element during manufacture of the secure element. Alternatively, applets and/or applications may be loaded, for example, OTA after a secure element has been manufactured (e.g., upon delivering the secure element to a user). Applets and/or applications may be generic or non-generic. Non-generic applets and/or applications may include couponing and loyalty applications, and/or any application that is not generic to multiple service providers. That is, a non-generic application may correspond to a single service provider. Data that may be used and/or associated with a non-generic application (e.g., offers, coupons) may be stored in the secure element or in memory outside of the secure element (e.g., non-volatile memory of a mobile device).

Generic applets and/or applications may include applets and/or applications that, when instantiated, can be used by multiple service providers. For example, a generic application of a payment network (e.g., MasterCard®) may be instantiated for multiple service providers by a central TSM, and therefore may be used by more than one service provider.

Packages including uninstantiated applets and/or applications may be owned or controlled by a single entity controlling a central TSM and/or a central SD. Uninstantiated applets and/or applications may be created under (i.e., directly associated with) a central SD on a secure element, and may be exclusively managed on the secure element by the central TSM using the central SD. In particular, the central SD maintains exclusive access to the WCAp, PPSE, packages, and SP SDs. However, service providers may transmit requests to the central TSM, for example, to rotate (i.e., exchange) security keys. After security keys of an SP SD have been rotated, the corresponding service provider can continue to send requests to the central TSM to execute commands on the corresponding SP SD. After key rotation, the central TSM has limited access to the SP SD. In particular, the central TSM can, for example, stop execution of an application or instantiate applications under the SP SD, but may not access the security keys or personalized content of the SP SD.

Exclusive ownership, control, and/or management of uninstantiated applets or applications allows a single entity to efficiently and cost effectively supervise the applets and/or applications. Further, exclusive ownership, control, and/or management increases security and minimizes the complexities caused by multiple service providers loading and controlling different applets and/or applications on a secure element. For example, a service provider may utilize an instance of an uninstantiated applet and/or application instead of certifying and installing an independent applet and/or application on the secure element.

Additionally, uninstantiated applets and/or applications may be instantiated, and each instance may then be extradited to a corresponding security domain. Instantiation may include personalizing applets and/or applications using data corresponding to the entity for which the instance is being created.

For example, multiple instances of an uninstantiated applet or application may be created for different entities (e.g., service providers) and each instance may be extradited to a different security domain for use by a different entity.

An applet or application on a secure element may function pursuant to requirements established by Global Platform, Europay, MasterCard®, Visa® (EMVCo.), MNOs, and payment networks (e.g., MasterCard®, Visa®, Discover®, American Express®). Applets or applications may be, for example, expresspay™ payWave™, PayPass™, Zip™, and the like.

For example, the SP TSM 103-1 sends a request to the central TSM 102 via the communications network 105, and the central TSM 102 sends a response back to the SP TSM 103-1 via the communications network 105. The SP TSM 103-1 sends a request, intended for the secure element 106a-1, to the central TSM 102 via the communications network 105. In turn, the central TSM 102 sends that request to the secure element 106a-1 via the respective mobile network 104-1.

In an alternative embodiment, the central TSM 102 can include and utilize an ESB to perform operations.

In an alternative embodiment, a plurality of service providers share one of the SP TSMs 103.

In an additional alternative embodiment, the memory 102b may be a database.

In another alternative embodiment, a plurality of mobile networks communicate with a plurality of SP TSMs.

Process

A. Communicating a Request from a Service Provider TSM to a Secure Element

Figure 2:
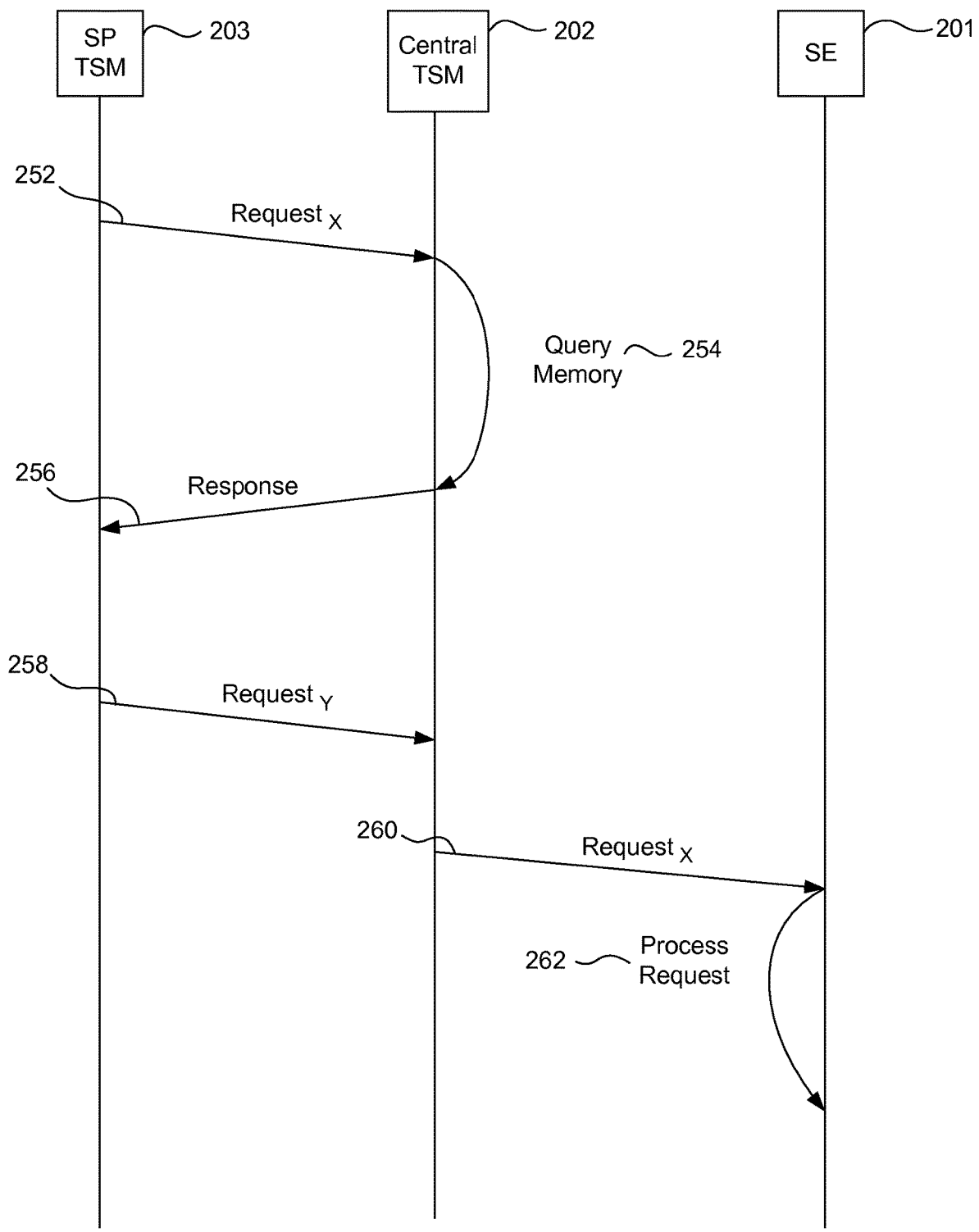
FIG. 2 is a sequence diagram illustrating a sequence for sending a request from a service provider trusted service manager to a secure element according to an exemplary embodiment.

FIG. 2. depicts a sequence diagram 200 for sending a request from an SP TSM 203 (e.g., FIG. 1, SP TSM 103-1) to a secure element 201 (e.g., FIG. 1, SE 106a-1), according to an exemplary embodiment. The request may be, for example, a request to the secure element 201 to process a script, manage a communication, or activate a service. These types of requests are discussed in further detail below with reference to FIGS. 2 and 3.

As shown in FIG. 2, at step 250, the SP TSM 203 transmits a request (Request$_x$) to the central TSM 202 over a communications network (e.g., FIG. 1, communications network 105). This request may be a request to retrieve secure element data including a secure element identifier, based on a mobile subscription identifier (MSI) included in request.

The secure element identifier is a unique number or set of characters which is written to the secure element 201 and may be used to identify the secure element 201. The secure element identifier may also include the type of identifier used to identify the secure element, such as a Card Image Number (CIN), which is a unique number that identifies the secure element and which is written to the secure element during its personalization.

The secure element data are attributes of the secure element 201. The secure element data may include the following information relating to the secure element 201: secure element identifier; name of the MNO associated with the secure element 201; service provider data for the service provider associated with SP TSM 203; master key index including a key for the service provider's security domain in the secure element 201; profile identifier; secure element type; standards versions (e.g., GlobalPlatform, JavaCard); certification level and expiration date.

The MSI is a unique number used to identify a mobile subscription of a mobile device associated with an MNO. The MSI may also include the name of the MNO associated with the mobile subscription as well as the type of identifier used to identify the mobile subscription of the mobile device, such as a mobile device number (MDN), which is generally a phone number associated with a particular line of service.

The central TSM 202 receives the request (Request$_x$), including the MSI, and queries its memory (Query Memory), at step 252. The memory may be a database including one or more MSIs and one or more corresponding secure element identifiers and secure element data. The memory may also include MNO data corresponding to each of the secure element identifiers. The MNO data may be information used to identify the MNO with which the secure element is associated, and may be used to select an appropriate mobile network to be used for communicating with the secure element. The query is a request to retrieve secure element data, including a secure element identifier corresponding to the MSI, from the memory.

Upon retrieving the secure element data corresponding to the MSI, the central TSM 202 transmits, at step 254, to the SP TSM 203, over the communications network, the retrieved secure element data stored in its database including the secure element identifier (Response). The central TSM 202 also transmits to the SP TSM 207 (Response) the corresponding MSI included in the request. In this way, the SP TSM 203 determines the identity of the secure element 201, to which it will send a request.

The SP TSM 203, using the secure element data received from the central TSM 202, transmits, at step 256, a request (Request$_y$) to the central TSM 202. The central TSM 202 receives this request (Request$_y$) including the secure element identifier of the secure element 201, to which the SP TSM 203 has addressed the request.

This request (Request$_y$) may include one or more requests for the secure element 201 to: manage a communication, process one or more scripts, or activate a service. For example, a request may be used to instruct a secure element to perform, for example, personalization, key rotation, and other processes discussed below with reference to FIGS. 3 and 4.

The central TSM 202 determines a mobile network (e.g., FIG. 1, mobile network 104-1) from a plurality of mobile networks based on MNO data in the memory which corresponds to the secure element data in the request (Request$_y$). Upon determining the mobile network, the central TSM 202 transmits, at step 258, a request (Request$_z$), which is based on the previous request (Request$_y$), to the secure element 201 over the mobile network. In this way, the secure element 201 may process, at step 260, the request (Process Request).

In an alternative embodiment, the secure element 201 may transmit to the central TSM 202, over the mobile network, a response after completing or processing the request from the SP TSM 203. The response may include, for example, information indicating whether the processing of a request succeeded or failed.

In an alternative embodiment, the secure element data may not include the secure element identifier. In such a case, the SP TSM 203 may request the secure element identifier (based on the MSI) and the secure element data separately, and the central TSM 202 may provide the secure element identifier and the secure element data in separate responses to the SP TSM 203.

In an alternative embodiment, the SP TSM 203 may initially transmit a request to the central TSM 202 to pre-provision the secure element 201, including creating one or more security domains on the secure element 201, if necessary (i.e., if one or more security domains corresponding to the SP TSM 203 have not been created). Once the one or more security domains have been created, the SP TSM 203 can transmit subsequent requests to the central TSM 202 including, for example, a request to instantiate an uninstantiated application. In turn, the central TSM 202 extradites the instantiated application (i.e., the instance) to a corresponding security domain (e.g., central SD, SP SD).

In an alternative embodiment, the central TSM 202 includes an ESB, and utilizes the ESB to process requests including, for example, to process a script, manage a communication, or activate a service.

B. Communicating Multiple Service Provider TSM Requests to a Secure Element

Figure 3:
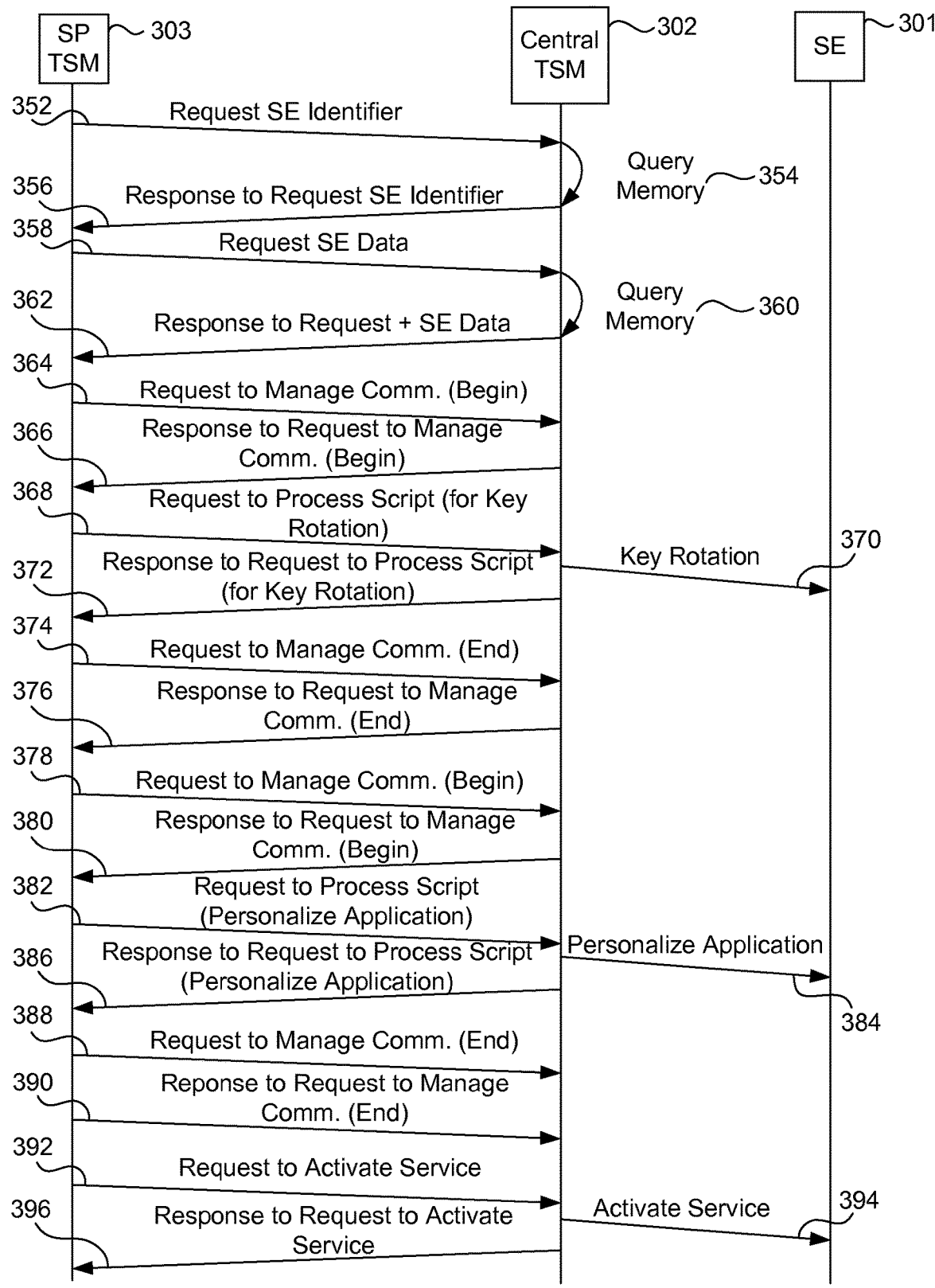
FIG. 3 is a sequence diagram illustrating a sequence for sending multiple requests from a service provider trusted service manager to a secure element according to an exemplary embodiment.

FIG. 3 depicts sequence diagram 300 for sending multiple requests from an SP TSM 303 (e.g., FIG. 1, SP TSM 103-1) to a secure element 301 (e.g., FIG. 1, SE 106*a*-1) according to an exemplary embodiment.

In FIG. 3, at step 352, the SP TSM 303 transmits a request (Request SE Identifier), over a communications network (e.g., FIG. 1, communications network 105), to the central TSM 302, including a request to obtain a secure element identifier. The request (Request SE Identifier) includes an MSI, which is associated with the secure element 301 to which the SP TSM 303 wishes to send a request. Using the MSI, at step 354, the central TSM 302 performs a query (Query Memory) and retrieves the secure element identifier corresponding to the MSI included in the request. At step 356, the central TSM 302 transmits (Response to Request SE Identifier) the retrieved secure element identifier to the SP TSM 303 over the communications network.

Once the SP TSM 303 receives the secure element identifier, the SP TSM 303 transmits, at step 358, a request (Request SE Data), over the communications network, to the central TSM 302, including a request to obtain secure element data (as discussed in further detail above with reference to FIG. 2) associated with the secure element 301. This request (Request SE Data) includes the secure element identifier (received from the central TSM 302) and the corresponding MSI. Using the secure element identifier and corresponding MSI, at step 360, the central TSM 302 performs a query (Query Memory) and retrieves the secure element data corresponding to the secure element identifier. At step 362, the central TSM 302 transmits (Response to Request SE Data) the retrieved secure element data to the SP TSM 303 over the communications network.

At step 364, the SP TSM 303 subsequently transmits a request (Request to Manage Comm. (Begin)), based on the received secure element identifier and data, to manage a communication to the central TSM 302.

1. Managing a Communication

In general, a request to manage a communication may include a request to begin a communication or a request to end a communication. In an exemplary embodiment, a communication is a notification from a first device (e.g., SP TSM 303, central TSM 302) to a second device (e.g., secure element 301), that the first device intends to perform an over-the-air (OTA) communication or operation with the second device.

As shown in FIG. 3, at step 364, the SP TSM 303 transmits a request (Request to Manage Comm. (Begin)) to establish a communication to the central TSM 302, over the communications network, so that the communication parameters and identifiers can be established. Doing so notifies the central TSM 302 that the SP TSM 303 will request execution of an operation on the secure element 301. This operation may be, for example, the execution of scripts requested by the SP TSM 303, or the activation of a service on the secure element 301.

The communication request (Request to Manage Comm. (Begin)) transmitted at step 364 by the SP TSM 303 to the central TSM 302 may include the following attributes: secure element identifier, MSI, service identifier, service qualifier, target application identifier, format and size of scripts to be executed during the OTA communication, and operation requested (e.g., key rotation, personalization). The "operation requested" attribute is used by the central TSM 302 to track the progress of that operation.

The service identifier may include a service identifier number and version, which are used to identify a general definition of the service. The service qualifier includes a service provider name and payment account reference number (PRN).

The service qualifier is used to identify the particular instance of the service (i.e., the service corresponding to the service identifier) that is to be acted on (e.g., installed, locked, unlocked, deleted) using requests, including commands, during a communication.

The PRN is a unique number for identifying a credential or card (e.g., payment card) associated with a service.

As shown in FIG. 3, after receiving the request (Request to Manage Comm. (Begin)), the central TSM 302, at step 366, transmits a response (Response to Request to Manage Comm. (Begin)) to the SP TSM 303, over the communications network. This response may include the following attributes: a communication identifier, OTA bearer (i.e., entity in charge of transmitting the request), maximum number and size of scripts to be requested in an operation, script format, and the permitted length of the communication.

As further shown in FIG. 3, at steps 374 and 388, after one or more scripts are processed (discussed below in further detail), the SP TSM 303 transmits a request (Request to Manage Comm. (End)) to end the communication (i.e., the communication corresponding to the communication identifier) to the central TSM 302, over the communications network. This request may include the communication identifier previously received by the SP TSM 303, as well as the status of the operation (e.g., failed or succeeded). Doing so, the SP TSM 303 indicates that the communication corresponding to the communication identifier is no longer intended to be used, and the communication may no longer be used. At steps 376 and 390, the central TSM 302 sends a response (Response to Request to Manage Comm. (End)), indicating the status of the operation (e.g., failed or succeeded), to the SP TSM 303, over the communications network.

As shown in FIG. 3, while the communication is open (i.e., a communication has begun and has not ended), the SP TSM 303 sends a request to the central TSM 302 to process one or more scripts.

2. Processing One or More Scripts

In general, a request to process one or more scripts enables the SP TSM 303, using the central TSM 302, to request sending a set of command application protocol data units (APDUs) directed to the secure element 301 and to be executed on the secure element 301. This request may be based on, for example, Global Platform messaging standards, and may be used, for example, to request: application personalization, key rotation, and/or post-personalization. A list of commands which can be sent to the secure element for processing are discussed below with reference to FIGS. 5-8.

Each script or command APDU may be used to execute an operation based on or using data that is prestored (i.e., loaded during manufacture) on the secure element. This data may include, for example, code, applets or applications. Using scripts and/or APDUs commands, the SP TSM 303 may request that the central TSM 302 instantiate, for example, an uninstantiated application on the secure element 301, and extradite the instance to a corresponding security domain on the secure element 301.

In an exemplary embodiment, application personalization is the insertion or upload of data onto an application on a security domain in a secure element. That is, a service provider may insert or upload sensitive data, including account and customer data, onto an application on a secure element in the customer's mobile device. More specifically, an SP TSM may transmit a request to personalize an application, including commands and data, to a central TSM. The central TSM may then send a request, based on the request received from the SP TSM, to the secure element to personalize the application on the secure element associated with the customer.

In an exemplary embodiment, key rotation is the concept of setting or inserting a digital key (i.e., an algorithm that undoes the work of an encryption algorithm) provided by a service provider into a security domain in a secure element.

In an exemplary embodiment, post-personalization is the concept of sending requests, including command APDUs to a secure element via a central TSM. In particular, post-personalization requests are sent by a service provider to execute outstanding commands after personalization has been performed.

The request to process one or more scripts may include a communication identifier (as described above) and a list of command APDUs to be sent to and executed in the secure element 301, with reference to a security domain. That is, the SP TSM 303 uses an established communication (and the attributes defined therein) to send a list of commands to the secure element 301 to be executed with regard to a specific and corresponding application or to an uninstantiated application.

Examples of command APDUs include: "Delete Key," "Get Data," "Get Status," "Put Key," "Select," "Set Status," "Store Data," and "Install". These command APDUs may be used to retrieve applications and application data, select applications, lock and unlock applications, personalize applications, instantiate uninstantiated applications, extradite instantiated applications to corresponding SP SDs, and update and delete security domain keys. Command APDUs are described in further detail below with reference to FIGS. 5-8.

As shown in FIG. 3, at step 368, the SP TSM 303 transmits a request (Request to Process Script (for key rotation)) to process a script to the central TSM 302, over the communications network. In particular, this request includes a communication identifier, which is the established communication that will be used to transmit the request. This request also includes commands (i.e., command APDUs) to perform key rotation on the security domain in the secure element 301. In response, at step 372, the central TSM 302 transmits a response (Response to Request to Process Script (for key rotation)) to the SP TSM 303 including a list of response APDUs and a list of command APDUs that failed execution.

As further shown in FIG. 3, after the request to perform the key rotation is processed at step 370, the SP TSM 303 requests ending the previously initiated communication by sending a request (Request to Manage Comm. (End)), at step 374, to the central TSM 302. At step 376, the central TSM transmits a response (Response to Request to Manage Comm. (End)) to the SP TSM 303. In turn, the SP TSM 303 requests initiation (i.e., begin), at step 378, a subsequent communication by transmitting a request (Request to Manage Comm. (Begin)) and obtains a corresponding communication identifier, at step 380, in a response (Response to Request to Manage Comm. (Begin)) from the central TSM 302. Using the communication and communication identifier obtained in step 380, the SP TSM 303 transmits, at step 382, an additional request (Request to Process Script (Personalize Application)) to process a script to the central TSM 302, over the communications network. In particular, this request includes a communication identifier, which is the open communication that will be used to transmit the request, and a list of commands (i.e., command APDUs) to perform application personalization on the security domain in the secure element 301. At step 384, this request is processed (Personalize Application). In response, at step 386, the central TSM 302 transmits a response (Response to Request to Process Script (Personalize Application)) to the SP TSM 303 including a list of response APDUs and a list of command APDUs that failed execution. At step 388, the SP TSM 303, transmits a request (Request to Manage Comm. (End)) to the central TSM 302 to end the communication. At step 390, the central TSM 302 transmits a response (Response to Request to Manage Comm. (End)).

In an alternative embodiment, the request to perform key rotation and the request to perform application personalization are transmitted from the SP TSM 303 to the central TSM 302 in a single request.

In another alternative embodiment, multiple operations are performed during a single communication.

3. Activating a Service

As shown in FIG. 3, at step 392, the SP TSM 303 transmits a request (Request to Activate Service) to the central TSM 302 to activate a service (e.g., a payment service), over the communications network.

In general, a request to activate a service is used to activate a service provider's service and make the applications associated with that service selectable on a particular secure element. This request may include the following attributes: secure element identifier, MSI, service identifier, and service qualifier. The service identifier and service qualifier may be used to identify the general and particular instance of the service to be activated on the secure element 301.

The central TSM 302 receives the request to activate a service, and processes the request at step 394 using the information provided in the request. The central TSM 302, at step 396, transmits a response (Response to Request to Activate Service) to the request to the SP TSM 303, including information indicating the execution status of the request (i.e., whether execution failed or succeeded).

In an alternative embodiment, the request to activate a service and requests to perform key rotation and/or application personalization are transmitted from the SP TSM 303 to the central TSM 302 in a single request.

In an alternative embodiment, the central TSM 302 includes an ESB, and utilizes the ESB to process requests including, for example, to process a script, manage a communication, or activate a service.

C. Transmitting a Pre-personalization Request from an SP TSM to a Secure Element FIG. 4 depicts an exemplary sequence diagram 400 for sending a request for pre-personalization from an SP TSM 403 (e.g., FIG. 1, SP TSM 103-1) to a secure element 401 (e.g., FIG. 1, SE 106a-1).

Figure 4:
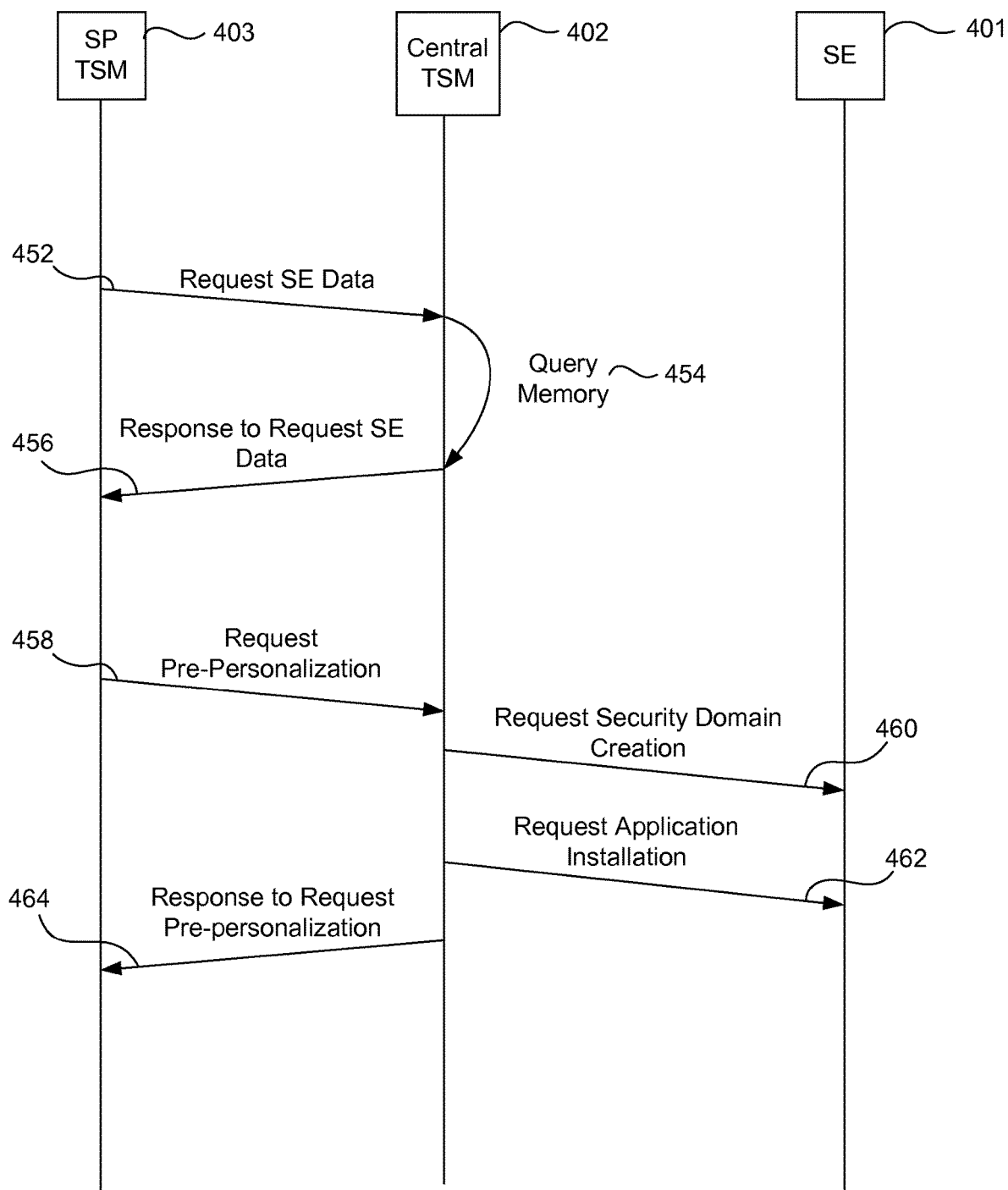
FIG. 4 is a sequence diagram illustrating a sequence for sending a pre-personalization request from a service provider trusted service manager to a secure element according to an exemplary embodiment.

In FIG. 4, at step 452, the SP TSM 403 transmits a request (Request SE Data), over a communications network (e.g., FIG. 1, communications network 105) to the central TSM 402, to obtain secure element data including a secure element identifier. The request includes an MSI.

Upon receiving the request, the central TSM 402, at step 454, queries a memory (Query Memory) for the secure element data including the secure element identifier, based on the MSI included in the request (Request SE Data). Once the secure element data has been retrieved, the central TSM 402 transmits, at step 456, a response (Response to Request SE Data) including the secure element data to the SP TSM 403.

As shown in FIG. 4, at step 458, the SP TSM 403 transmits a pre-personalization request (Request Pre-personalization) to the central TSM 402, over the communications network. This request may include attributes to identify the service (and its corresponding applications) for which pre-personalization is requested, as well as commands for executing the pre-personalization request. Notably, the request does not include the applications of the service to be instantiated on the secure element.

In an example embodiment, pre-personalization includes creating a security domain, instantiating one or more uninstantiated applications, and extraditing the instance to the security domain. Pre-personalization may also include determining whether security domains and applications already exist on the secure element, performing a technical eligibility check, and loading and instantiating applications.

The central TSM 402 receives the pre-personalization request and, based on this request, transmits, at step 460, a request (Request Security Domain Creation) to the secure element 401 to create a security domain (discussed in further detail below with reference to FIGS. 5 to 8). After the security domain is created on the secure element 401, the central TSM 402 transmits, at step 462, a request (Request Application Installation) to the secure element 401 to instantiate one or more applications associated with the service of the service provider.

The central TSM 402, after transmitting the requests to the secure element 401, transmits, at step 464, a pre-personalization response (Response to Request Pre-personalization) to the SP TSM 403, indicating whether the pre-personalization requested by the SP TSM 403 failed or succeeded.

The secure element 401 may also transmit a response to each request, after each request has been processed.

The central TSM 402 may also determine whether applications are instantiated and/or whether security domains are created on a secure element.

The SP TSM 403 requests to the central TSM 402 are transmitted via an enterprise service bus (ESB).

In an alternative embodiment, the central TSM 402 includes an ESB, and utilizes the ESB to process requests including, for example, to process a script, manage a communication, or activate a service.

D. Embedded Secure Element Configuration

Figure 5:
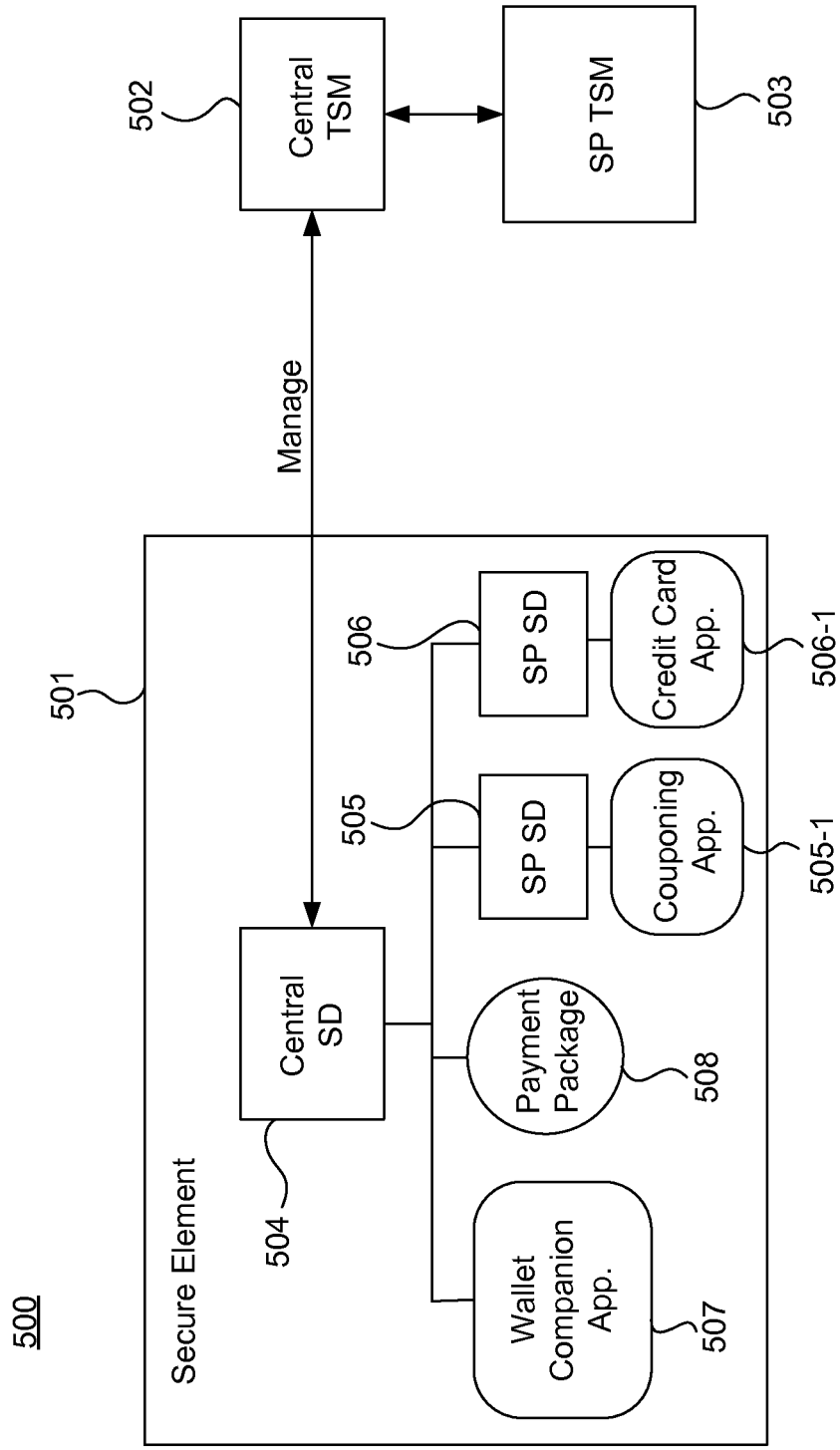
FIG. 5 is a diagram of a secure element configuration according to an exemplary embodiment.

FIG. 5 depicts a secure element configuration 500 according to an exemplary embodiment. As depicted in FIG. 5, the secure element configuration 500 includes a secure element 501, a central TSM 502, and an SP TSM 503. The secure element 501 includes a central security domain (SD) 504, an SP SD 505 and an SP SD 506. The secure element 501 is implemented as an embedded secure element, or as an NFC enabler such as a separate chip or secure device.

The central SD 504 may perform content management operations on the secure element 501, including instantiating applets (e.g., applets 505-1 and 506-1). That is, applets 505-1 and 506-1 are instances of applications (i.e., uninstantiated applications). In particular, the central SD 504 may securely manage applications (e.g., applets 505-1 and 506-1), create SP SDs, and perform management operations on applets or applications in the secure element.

Each of SP SDs 505 and 506 are associated with applet instances 505-1 and 506-1, respectively, and the SP SDs 505 and 506 assist their respective applets in the establishment of secure channels and in the applet personalization process. Applet instances 505-1 and 506-1 may be created by instantiating uninstantiated applets or applications. Applet instances (e.g., applets 505-1 and 506-1) are created under (i.e., associated with) the central SD 504, and if appropriate, the applet instances are extradited (i.e., delivered) to their respective SP SDs (e.g., applet 505-1 is extradited to its respective SD, SP SD 505). If the instances are not extradited, they may remain under the central SD 504.

As illustrated in FIG. 5, the central TSM 502 manages the central SD 504. That is, the central TSM 502 acts as a secure element manager by controlling the keys of the central SD 504 (and its associated applications), and therefore can use any of its associated privileges (discussed in further detail below with reference to Table 1). Through the central SD 504, the central TSM 502 may load, install, extradite, lock or delete any applet or application on the secure element 501. Additionally, the central TSM 502 may create and manage SP SDs, and may lock the secure element 501.

As illustrated in FIG. 5, the SP TSM 503 is associated with and manages SP SD 506 and the applet 506-1. That is, the SP TSM 503 holds the keys to the SP SD 506 and the applet 506-1, and can use any of the privileges associated with the SP SD 506 (discussed in further detail below with reference to Table 1).

SP SDs 505 and 506 have Data Authentication Pattern (DAP) verification privilege (discussed in further detail below with reference to Table 1), in order to verify the integrity of binary files managed and handled by the central TSM 502. Data packages that do not require DAP verification are loaded under (i.e., associated with) the central SD 504 (e.g., payment package 508), and data packages that require DAP verification are loaded under their respective SP SDs.

Table 1 illustrates privileges (e.g., Global Platform privileges) assigned to a central SD (e.g., central SD 504) and an SP SD (e.g., SP SDs 505 and 506), according to the secure element configuration 500.

TABLE 1

| Privileges | Central SD | SP SD |
|---|---|---|
| Security Domain | Yes | Yes |
| DAP Verification | | Optional |
| Delegated Management | | |
| Card Lock | Yes | |
| Card Terminate | Yes | |
| Default Selected | | |
| CVM Management | Yes | |
| Mandated DAP Verification | | |

Table 2 illustrates privileges (e.g., Global Platform privileges) commands supported by a central SD (e.g., central SD 504), according to the secure element configuration 500.

TABLE 2

| Command | Support |
|---|---|
| DELETE | Required with tag 4F (ELF or Application AID); Optional with tags D0 (Key Identifier) and D2 (Key Version Number); N/A with tags B6 and 9E (related to SCP 10). |
| GET DATA | Required, with the following tags: 42 (Issuer Provider Identification Number) 45 (Card Image Number) 66 (Card Data) E0 (Key Information Template) C1 (Sequence Counter of Default Key Version Number) |
| GET STATUS | Required. |
| INSTALL [for Load] | Required, without specific parameters. |
| INSTALL [for Install] | Required, with tag C9 (Application-Specific Parameters). |
| INSTALL [for Make Selectable] | Required, without specific parameters. |
| INSTALL [for Personalization] | Optional. |
| INSTALL [for Registry Update] | N/A. |
| INSTALL [for Extradition] | Required. |
| LOAD | Required, with tags C4 (Load File Data Block) and E2 (DAP Block). |
| MANAGE CHANNEL | Optional. |
| PUT KEY | Required for the central SD keys. |
| SET STATUS | Required. |

Table 3 illustrates the commands (e.g., Global Platform commands) supported by an SP SD (e.g., SP SDs 505 and 506), according to the secure element configuration 500.

TABLE 3

| Command | Support |
|---|---|
| DELETE | N/A. |
| GET DATA | Required, with the following tags: 42 (SD Provider Identification Number) 45 (SD Image Number) 66 (SD Management Data) E0 (Key Information Template) C1 (Sequence Counter of Default Key Version Number) |
| GET STATUS | Required. |
| INSTALL [for Load] | N/A. |
| INSTALL [for Install] | N/A. |
| INSTALL [for Make Selectable] | N/A. |
| INSTALL [for Personalization] | Optional. |
| INSTALL [for Registry Update] | N/A. |
| INSTALL [for Extradition] | N/A. |

TABLE 3-continued

| Command | Support |
| --- | --- |
| LOAD | N/A. |
| MANAGE CHANNEL | Optional. |
| PUT KEY | Required for the SP SD keys. |
| SET STATUS | Required for SP SD (and its applications). |
| STORE DATA | Required with the following tags: 42 (Issuer Identification Number) 45 (SD Image Number) 66 (SD Management Data) |

In an alternative embodiment, one or both of SP SDs 505 and 506 do not have DAP verification privilege.

In an alternative embodiment, the secure element 501 includes multiple central SDs.

In another alternative embodiment, each SP SD is associated with a corresponding SP TSM.

E. UICC Secure Element Configuration

Figure 6:
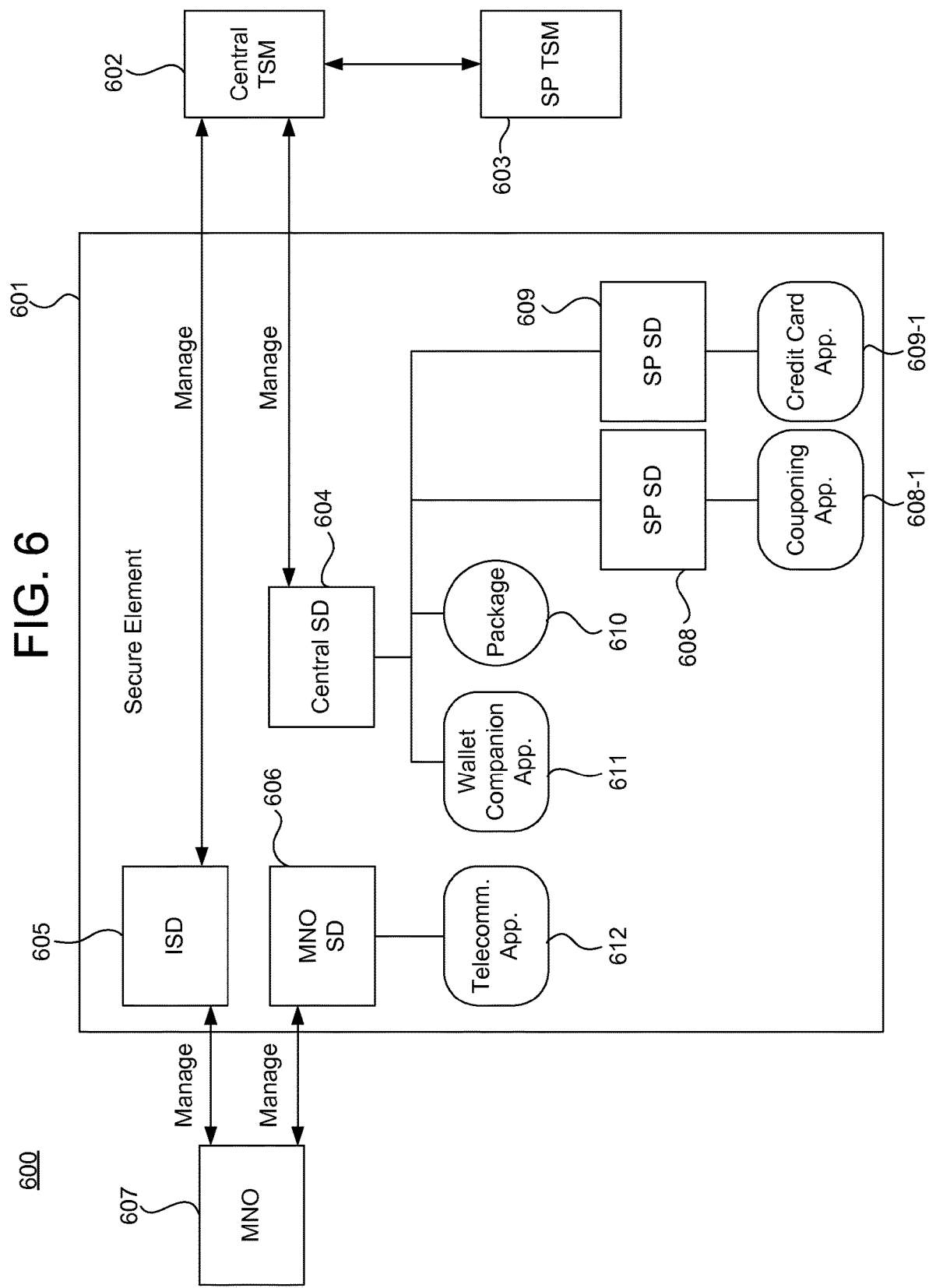
FIG. 6 is a diagram of a secure element configuration according to an exemplary embodiment.

FIG. 6 depicts a secure element configuration 600 according to an exemplary embodiment. As depicted in FIG. 6, the secure element configuration 600 includes a secure element 601, a central TSM 602, an SP TSM 603, and an MNO 607.

The secure element 601 is implemented as a UICC, and includes a central SD 604, a secure element issuer SD (ISD) 605, an MNO SD 606, an SP SD 608 and an SP SD 609. The MNO SD 606 is associated with a telecommunications applet 612. The central SD 604 is associated with a package 610, and a wallet companion applet 611. The SP SDs 608 and 609, which are associated with the central SD 604, are associated with applets 608-1 and 609-1, respectively.

The ISD 605 creates the central SD 604 and the MNO SD 606, but does not perform any other content management functions.

The MNO SD 606 has Authorized Management privileges (discussed in further detail below with reference to Table 2), and manages content as instructed by the MNO 607.

The central SD 604 has Authorized Management privileges (discussed in further detail below with reference to Table 2), and manages content as instructed by the central TSM 602. In particular, the central SD 604 may securely manage applications, create SP SDs, and perform management operations on applets or applications in the secure element.

The SP SDs 608 and 609 assist their respective applets in the establishment of secure channels and in the applet personalization process. Applet instances 608-1 and 609-1 may be created by instantiating uninstantiated applets or applications. Applet instances (e.g., applets 608-1 and 609-1) are created under (i.e., associated with) the central SD 604. After instantiation, if appropriate, the applet instances are extradited (i.e., delivered) to their respective SP SDs (e.g., applet 608-1 is extradited to its respective SD, SP SD 608). Alternatively, if an applet instance is not extradited, it may remain under the central SD 604.

SP SDs 608 and 609 have DAP verification privilege, in order to verify the integrity of binary files managed and handled by the central TSM 602. Data packages that do not require DAP verification are loaded under (i.e. associated with) the central SD 604 (e.g., package 610), and the data packages that require DAP verification are loaded under their respective SP SDs.

As illustrated in FIG. 6, the central TSM 602 manages the central SD 604. That is, the central TSM 602 acts as a secure element manager by controlling the keys of the central SD 604 (and its associated applications), and therefore can use any of its associated privileges (discussed in further detail below with reference to Table 4). Through the central SD 604, the central TSM 602 may load, install, extradite, lock or delete any associated applet or application on the secure element 601. Additionally, the central TSM 602 may create and manage SP SDs.

As further illustrated in FIG. 6, the MNO 607 is associated with and manages MNO SD 606 and the telecommunications applet 612. Therefore, the MNO 607 can use any of the privileges of MNO SD 606. Through the MNO SD 606, the MNO 607 may load, install, extradite, lock or delete any associated applet or application on the secure element 601. Additionally, MNO packages and applet instances are loaded and/or created under (i.e., associated with) the MNO SD 606.

Table 4 illustrates privileges (e.g., Global Platform privileges) assigned to an ISD (e.g., ISD 605), a central SD (e.g., central SD 604), an MNO SD (e.g., MNO SD 606), and an SP SD (e.g., SP SDs 608 and 609), according to the secure element configuration 600.

TABLE 4

| Privileges | ISD | Central SD | MNO SD | SP SD |
| --- | --- | --- | --- | --- |
| Security Domain | Yes | Yes | Yes | Yes |
| DAP Verification | | | | Optional |
| Delegated Management | | | | |
| Card Lock | Yes | | | |
| Card Terminate | Yes | | | |
| Card Reset | | | | |
| CVM Management | Yes | | | |
| Mandated DAP Verification | | | | |
| Trusted Path | Yes | Yes | Yes | Yes |
| Authorized Management | Yes | Yes | Yes | |
| Token Verification | | | | |
| Global Delete | Yes | | | |
| Global Lock | Yes | | | |
| Global Registry | Yes | | | |
| Final Application | | | | |
| Global Service | | | | |
| Receipt Generation | | | | |

Table 5 illustrates the commands (e.g., Global Platform commands) supported by an ISD (e.g., ISD 605), according to the secure element configuration 600.

TABLE 5

| Command | Support |
| --- | --- |
| DELETE | Required with tag 4F (ELF or Application AID), and with tags D0 (Key Identifier) and D2 (Key Version Number); N/A with tags B6 and 9E (related to SCP 10). |
| GET DATA | Required with the following tags: 2F00 (List of Applications) 42 (Issuer Identification Number) 45 (Card Image Number) 66 (Card Data) E0 (Key Information Template) C1 (Sequence Counter of Default Key Version Number) |
| GET STATUS | Required. |
| INSTALL [for Load] | Required, with tags EF/C6, EF/C7, EF/C8, EF/D6 (Memory Management). |
| INSTALL [for Install] | Optional with the same parameters as the INSTALL [for Install & Make Selectable]. |
| INSTALL [for Make Selectable] | Optional. |
| INSTALL [for Install & Make Selectable] | Required, with tag C9 (Application-Specific Parameters) and tags EF/C6, EF/C7, EF/C8, EF/D7, EF/D8 (Memory Management). |
| INSTALL [for Personalization] | Required. |

TABLE 5-continued

| Command | Support |
|---|---|
| INSTALL [for Registry Update] | Required, without specific parameters. |
| INSTALL [for Extradition] | Required, without specific parameters. |
| LOAD | Required, with tags C4 (Load File Data Block) and E2 (DAP Block). |
| MANAGE CHANNEL | Required for UICC Optional for Embedded SE. |
| PUT KEY | Required for the ISD keys. |
| SET STATUS | Required. Only SD allowed to lock or terminate the card. |
| STORE DATA | Required with the following tags: 42 (Issuer Identification Number) 45 (Card Image Number) 4F (ISD AID) 66 (Card Data) |

Table 6 illustrates the commands (e.g., Global Platform commands) supported by a central SD (e.g., central SD 604), according to the secure element configuration 600.

TABLE 6

| Command | Support |
|---|---|
| DELETE | Required with tag 4F (ELF or Application AID), and with tags D0 (Key Identifier) and D2 (Key Version Number); N/A with tags B6 and 9E (related to SCP 10). |
| GET DATA | Required with the following tags: 2F00 (List of Applications) 42 (Service Provider Identification Number) 45 (SD Image Number) 66 (SD Management Data) E0 (Key Information Template) C1 (Sequence Counter of Default Key Version Number) C2 (Receipt Confirmation Counter (only if Delegated Management is supported) |
| GET STATUS | Required. |
| INSTALL [for Load] | Required, with tags EF/C6, EF/C7, EF/C8, EF/D6 (Memory Management). |
| INSTALL [for Install] | Required with the same parameters as the INSTALL [for Install & Make Selectable]. |
| INSTALL [for Make Selectable] | Required. |
| INSTALL [for Install & Make Selectable] | Required, with tag C9 (Application-Specific Parameters) and tags EF/C6, EF/C7, EF/C8, EF/D7, EF/D8 (Memory Management). Tags EF/82 and EF/83 are supported in case of Cumulated Granted Memory support. |
| INSTALL [for Personalization] | Required. |
| INSTALL [for Registry Update] | Required, without specific parameters. Tags EF/82 and EF/83 are supported in case of Cumulated Granted Memory support. |
| INSTALL [for Extradition] | Required, without specific parameters. |
| LOAD | Required, with tags C4 (Load File Data Block) and E2 (DAP Block). |
| MANAGE CHANNEL | Required (for UICC, optionally for Embedded SE). |
| PUT KEY | Required for the SD keys. |
| SET STATUS | Required, but not allowed to modify card/ISD status. |
| STORE DATA | Required with the following tags: 42 (SD Provider Identification Number) 45 (SD Image Number) 66 (SD Management Data) |

Table 7 illustrates the commands (e.g., Global Platform commands) supported by an MNO SD (e.g., MNO SD 606), according to the secure element configuration 600.

TABLE 7

| Command | Support |
|---|---|
| DELETE | Required with tag 4F (ELF or Application AID), and with tags D0 (Key Identifier) and D2 (Key Version Number). N/A with tags B6 and 9E (related to SCP 10). |
| GET DATA | Required with the following tags: 2F00 (List of Applications) 42 (Service Provider Identification Number) 45 (SD Image Number) 66 (SD Management Data) E0 (Key Information Template) C1 (Sequence Counter of Default Key Version Number) FF21 (Extended Card Resources Information (from TS 102.226)) |
| GET STATUS | Required. |
| INSTALL [for Load] | Required, with tags EF/C6, EF/C7, EF/C8, EF/D6 (Memory Management). |
| INSTALL [for Install] | Required with the same parameters as the INSTALL [for Install & Make Selectable]. |
| INSTALL [for Make Selectable] | Required. |
| INSTALL [for Install & Make Selectable] | Required, with tag C9 (Application-Specific Parameters) tags EF/C6, EF/C7, EF/C8, EF/D7, EF/D8 (Memory Management), and tags CA, EA (Toolkit Application and UICC Specific parameters). |
| INSTALL [for Personalization] | Required. |
| INSTALL [for Registry Update] | Required, without specific parameters. |
| INSTALL [for Extradition] | Required, without specific parameters. |
| LOAD | Required, with tags C4 (Load File Data Block) and E2 (DAP Block). |
| MANAGE CHANNEL | Required (for UICC, optionally for Embedded SE). |
| PUT KEY | Required for the SD keys. |
| SET STATUS | Required, but not allowed to modify card/ISD status. |
| STORE DATA | Required with the following tags: 42 (SD Provider Identification Number) 45 (SD Image Number) 66 (SD Management Data) |

In an alternative embodiment, one or both of SP SDs 608 and 609 do not have DAP verification privilege.

F. Embedded Secure Element Configuration with Third Party Security Domain

Figure 7:
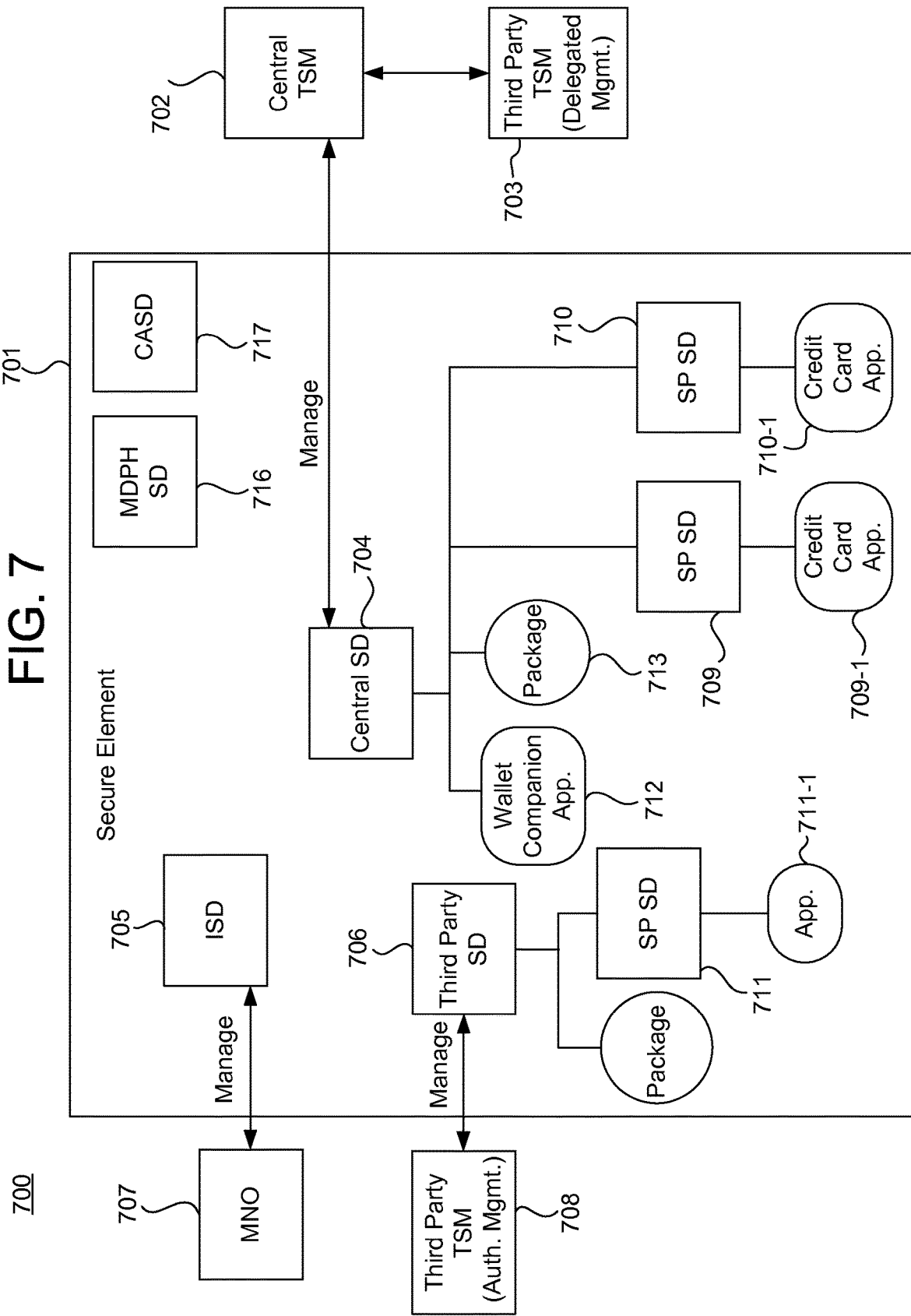
FIG. 7 is a diagram of a secure element configuration according to an exemplary embodiment.

FIG. 7 depicts a secure element configuration 700 according to an exemplary embodiment. As depicted in FIG. 7, the secure element configuration 700 includes a secure element 701, a central TSM 702, an MNO 707, a third party TSM (with Authorized Management) 708, and third party TSM (with Delegated Management) 703.

The secure element 701 is implemented as an embedded secure element or as an NFC enabler such as a separate chip or secure device, and includes a central SD 704, an ISD 705, a third party SD 706, a Mandated DAP Privilege Holder Security Domain (MDPH SD) 716, a Controlling Authority Security Domain (CA SD) 717, an SP SD 709, an SP SD 710 (with Delegated Management), and an SP SD 711.

The MDPH SD 716 verifies the signatures (i.e., DAP) of the applets and applications loaded or installed on the secure element 701. Table 10 (below) illustrates the commands supported by an MDPH SD.

The CA SD 717 performs key generation for newly created security domains, in order to guarantee confidential loading. Table 9 (below) illustrates the commands supported by a CA SD.

The third party SD 706 has Authorized Management privilege, and manages content as instructed by the third party TSM 708. The third party SD 706 is associated with a package 714. The SP SD 711 is under (i.e., it is associated with) the third party SD 706, and is associated with an application 711-1. Table 6 (above) illustrates the commands supported by a third party SD (e.g., third party SD 706).

The ISD 705 creates security domains, including central SD 704, and third party SD 706, but does not perform any other content management functions. Table 5 (above) illustrates the commands supported by an ISD (e.g., ISD 705) in further detail.

The central SD 704 has Authorized Management privileges (discussed in further detail below with reference to Tables 8.1 and 8.2), and manages the content as instructed by the central TSM 702. In particular, the central SD 704 may securely manage applications, create SP SDs, and perform management operations on applets or applications in the secure element. The central SD 704 is associated with a package 713, the SP SD 709 and the SP SD 710. The SP SDs 709 and 710 are associated with applets 709-1 and 710-1. Table 6 above illustrates the commands supported by a central SD.

The SP SDs 709, 710, and 711 assist their respective applets in the establishment of secure channels and in the applet personalization process. Applet instances 709-1 and 710-1 may be created by instantiating uninstantiated applets or applications. Applet instances (e.g., applets 709-1 and 710-1) are created under (i.e., associated with) the central SD 704. After instantiation, if appropriate, applet instances are extradited (i.e., delivered) to their respective SP SDs. Table 3 (above) illustrates the commands supported by an SP SD, and Table 11 (below) illustrates the commands supported by an SP SD with Delegated Management privileges (e.g., SP SD 710).

SP SDs 709 and 710 have DAP verification privilege, in order to verify the integrity of binary files managed and handled by the central TSM 702. Data packages that do not require DAP verification (e.g., package 713) are loaded under (i.e., associated with) the central SD 704, and the data packages that require DAP verification are loaded under their respective SP SDs. Additionally, the SP SDs with Delegated Management privileges (e.g., 710) may perform authorized content management operations.

As illustrated in FIG. 7, the central TSM 702 manages the central SD 704. That is, the central TSM 702 acts as a secure element manager by controlling the keys of the central SD 704 (and its associated applications), and therefore can use any of its associated privileges (discussed in further detail below with reference to Tables 8.1 and 8.2). Through the central SD 704, the central TSM 702 can load, install, extradite, lock, or delete any associated applet or application on the secure element 701. Additionally, the central TSM may create and manage SP SDs, and may lock and unlock the secure element 701 through the ISD 705.

As further illustrated in FIG. 7, the third party TSM 708 controls the keys of the third party SD 706 (and its associated applications), and therefore can use any of its associated privileges (discussed in further detail below with reference to Tables 8.1 and 8.2). Through the third party SD 706, the third party TSM 708 can load, install, extradite, lock or delete any associated applet or application. The third party TSM 708 can also create and manage SP SDs that are associated with its respective third party SD (i.e., third party SD 706). The third party TSM 708 can lock or delete any of its associated applets or applications on the secure element 701 through its third party SD 706. Packages that are associated with the third party TSM (e.g., package 714), are loaded under (i.e., associated with) the third party SD 706. Applets or applications that are associated with the third party TSM 708 (e.g., application 711-1) are instantiated and the instances are created under (i.e., associated with) the third party SD 706. After instantiation, if appropriate, the applets or applications are extradited (i.e., delivered) to their respective SP SDs (e.g., application 711-1 is extradited to its respective SD, SP SD 711).

Tables 8.1 and 8.2 illustrate the privileges (e.g., Global Platform privileges) assigned to an ISD (e.g., ISD 705), a central SD (e.g., central SD 704), an MDPH SD (e.g., MDPH SD 716), a CA SD (e.g., CA SD 717), a third party SD (e.g., third party SD 706), an SP SD (e.g., SP SD 709), and an SP SD with Delegated Management (e.g., SP SD 710).

TABLE 8.1

| Privileges | ISD | Central SD | MDPH SD | CA SD |
|---|---|---|---|---|
| Security Domain | Yes | Yes | Yes | Yes |
| DAP Verification | | | | |
| Delegated Management | | | | |
| Card Lock | Yes | | | |
| Card Terminate | Yes | | | |
| Card Reset | | | | |
| CVM Management | Yes | | | |
| Mandated DAP Verification | | | Yes | |
| Trusted Path | Yes | Yes | | |
| Authorized Management | Yes | Yes | | |
| Token Verification | | Yes | | |
| Global Delete | Yes | | | |
| Global Lock | Yes | | | |
| Global Registry | Yes | | | |
| Final Application | | | | |
| Global Service | | | | Yes |
| Receipt Generation | | Yes | | |

TABLE 8.2

| Privileges | Third Party SD | SP SD | SP SD (with Delegated Mgmt.) |
|---|---|---|---|
| Security Domain | Yes | Yes | Yes |
| DAP Verification | | Optional | Optional |
| Delegated Management | | | Yes |
| Card Lock | | | |
| Card Terminate | | | |
| Card Reset | | | |
| CVM Management | | | |
| Mandated DAP Verification | | | |
| Trusted Path | Yes | Yes | Yes |
| Authorized Management | Yes | | |
| Token Verification | | | |
| Global Delete | | | |
| Global Lock | | | |
| Global Registry | | | |
| Final Application | | | |
| Global Service | | | |
| Receipt Generation | | | |

Table 9 illustrates the commands (e.g., Global Platform commands) supported by a CA SD (e.g., CA SD 717), according to the secure element configuration 700.

TABLE 9

| Command | Support |
| --- | --- |
| DELETE | N/A |
| GET DATA | Required with the following tags: |
| | 42 (SD Provider Identification Number) |
| | 45 (SD Image Number) |
| | 66 (SD Management Data) |
| | E0 (Key Information Template) |
| | C1 (Sequence Counter of Default Key Version Number) |
| GET STATUS | Required. |
| INSTALL [for Load] | N/A. |
| INSTALL [for Install] | N/A. |
| INSTALL [for Make Selectable] | N/A. |
| INSTALL [for Personalization] | N/A. |
| INSTALL [for Registry Update] | N/A. |
| INSTALL [for Extradition] | N/A. |
| LOAD | N/A. |
| MANAGE CHANNEL | N/A. |
| PUT KEY | Required for the CA SD keys. |
| SET STATUS | Required for CA SD itself. |
| STORE DATA | Required with the following tags: |
| | 42 (SD Provider Identification Number) |
| | 45 (SD Image Number) |
| | 66 (SD Management Data) |

Table 10 illustrates the commands (e.g., Global Platform commands) supported by an MDPH SD (e.g., MDPH SD 716), according to the secure element configuration 700.

TABLE 10

| Command | Support |
| --- | --- |
| DELETE | N/A |
| GET DATA | Required with the following tags: |
| | 42 (SD Provider Identification Number) |
| | 45 (SD Image Number) |
| | 66 (SD Management Data) |
| | E0 (Key Information Template) |
| | C1 (Sequence Counter of Default Key Version Number) |
| GET STATUS | Required. |
| INSTALL [for Load] | N/A. |
| INSTALL [for Install] | N/A. |
| INSTALL [for Make Selectable] | N/A. |
| INSTALL [for Personalization] | N/A. |
| INSTALL [for Registry Update] | N/A. |
| INSTALL [for Extradition] | N/A. |
| LOAD | N/A. |
| MANAGE CHANNEL | N/A. |
| PUT KEY | Required for the MDPH SD keys. |
| SET STATUS | Required for MDPH SD itself. |
| STORE DATA | Required with the following tags: |
| | 42 (Issuer Identification Number) |
| | 45 (SD Image Number) |
| | 66 (SD Management Data) |

Table 11 illustrates the commands (e.g., Global Platform commands) supported by an SP SD with Delegated Management (e.g., SP SD 710), according to the secure element configuration 700.

TABLE 11

| Command | Support |
| --- | --- |
| DELETE | Required with tag 4F (ELF or Application AID), and with tags D0 (Key Identifier) and D2 (Key Version Number). |
| | N/A with tags B6 and 9E (related to SCP 10). |
| GET DATA | Required with the following tags: |
| | 2F00 (List of Applications) |
| | 42 (Service Provider Identification Number) |
| | 45 (SD Image Number) |
| | 66 (SD Management Data) |
| | E0 (Key Information Template) |
| | C1 (Sequence Counter of Default Key Version Number) |
| | C2 (Receipt Confirmation Counter (for Delegated Management)) |
| GET STATUS | Required. |
| INSTALL [for Load] | Required, with tags EF/C6, EF/C7, EF/C8, EF/D6 (Memory Management), and with Load Token. |
| INSTALL [for Install] | Required (see INSTALL [for Install & Make Selectable]). |
| INSTALL [for Make Selectable] | Required (see INSTALL [for Install & Make Selectable]). |
| INSTALL [for Install & Make Selectable] | Required, with tag C9 (Application-Specific Parameters) and tags EF/C6, EF/C7, EF/C8, EF/D7, EF/D8 (Memory Management) and with Install and Make Selectable Tokens. |
| INSTALL [for Personalization] | Required. |
| INSTALL [for Registry Update] | Required, without specific parameters, and with Registry Update Token. |
| INSTALL [for Extradition] | Required, without specific parameters, and with Extradition Token. |
| LOAD | Required, with tags C4 (Load File Data Block) and E2 (DAP Block). |
| MANAGE CHANNEL | Required (for UICC, optionally for Embedded SE). |
| PUT KEY | Required for the SP SD keys. |
| SET STATUS | Required, only for SP SD and its applications. |
| STORE DATA | Required with the following tags: |
| | 42 (Service Provider Identification Number) |
| | 45 (SD Image Number) |
| | 66 (SD Management Data) |
| | Also supported for personalization of applications after INSTALL [for Personalization]. |

In an alternative embodiment, the third party TSM 703 has Delegated Management privileges, but content management operations are first be approved by the central TSM 702. The central TSM 702 can verify tokens and generate receipts for each associated SP SD that is not also associated with a third party TSM (e.g., SP SD 709). The third party TSM 703 controls the keys to its associated SP SDs (e.g., SP SD 710) and can load, install, extradite, or delete any associated applications or applets (e.g., applet 710-1) through its associated SP SD.

In an alternative embodiment, one or both of SP SDs 709 and 710 do not have DAP verification privilege.

In an alternative embodiment, one or both of MDPH SD 716 and CA SD 717 are not included in the secure element 701.

In another alternative embodiment, the secure element 701 has zero or more third party SDs.

G. UICC Secure Element Configuration with Third Party Security Domain

Figure 8:
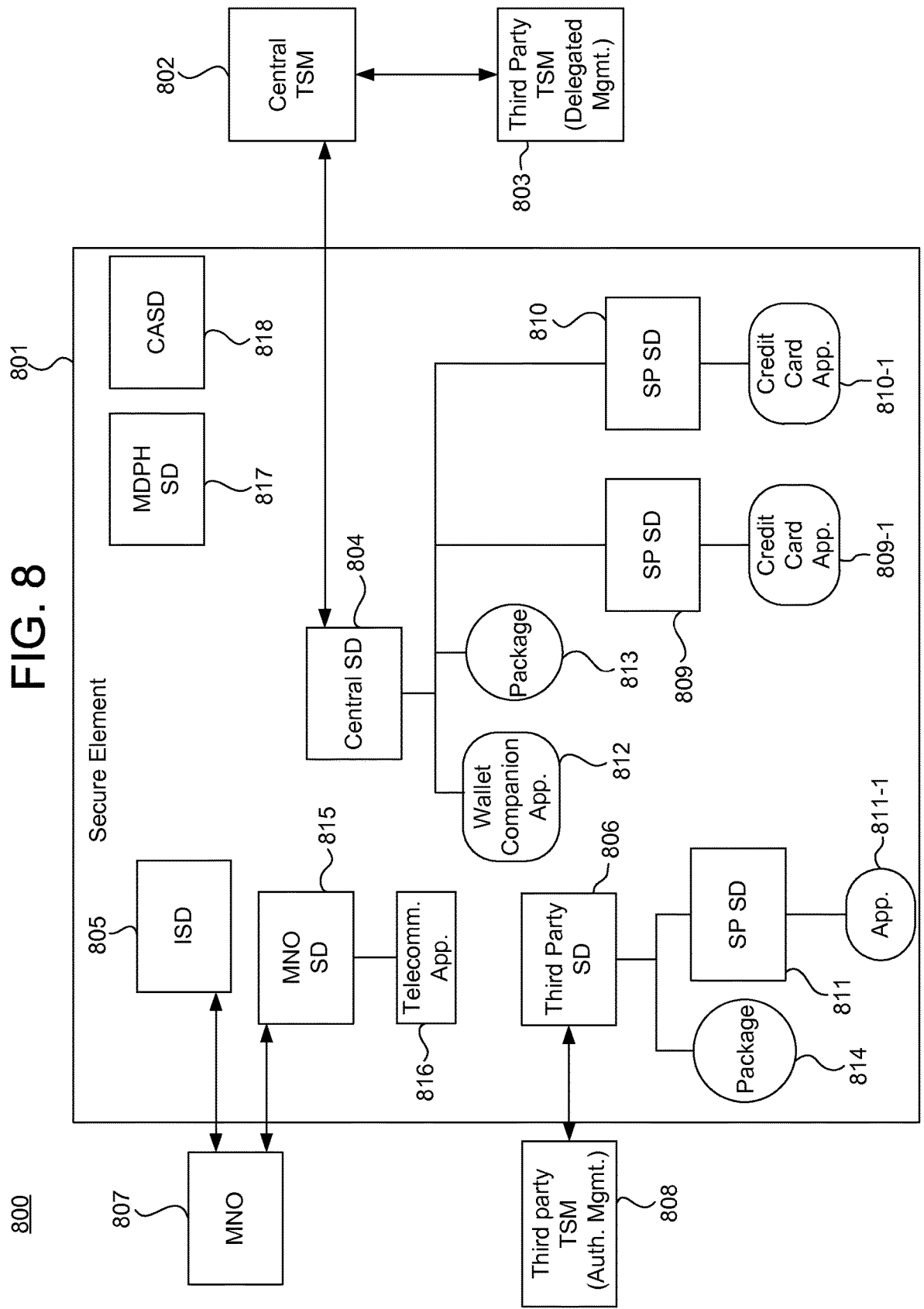
FIG. 8 is a diagram of a secure element configuration according to an exemplary embodiment.

FIG. 8 depicts a secure element configuration 800 according to an exemplary embodiment. As depicted in FIG. 8, the secure element configuration 800 includes a secure element 801, a central TSM 802, and MNO 807 a third party TSM (with Authorized Management) 808, and a third party TSM (with Delegated Management) 803.

The secure element 801 is implemented as a UICC, and includes a central SD 804, an ISD 805, a third party SD 806, an MNO SD 815, an MDPH SD 817, and a CA SD 818. The secure element 801 also includes an SP SD 809, and SP SD (with Delegated Management) 810, and an SP SD 811.

The MNO SD 815 has Authorized Management privileges and can manage content as instructed by the MNO 807.

The MDPH SD 817 verifies the signatures (i.e., DAP) of the applets and applications loaded or installed on the secure element 801. Table 10 (above) illustrates the commands supported by an MDPH SD.

The CA SD 818 performs key generation for newly created security domains, in order to guarantee confidential loading. Table 9 (above) illustrates the commands supported by a CA SD.

The third party SD 806 has Authorized Management privilege, and manages content as instructed by the third party TSM 808. The third party SD 806 is associated with a package 814. The SP SD 811 is under (i.e., it is associated with) the third party SD 806, and is associated with an application 811-1. The third party SD 806 supports the same commands illustrated in Table 6 (above).

The ISD 805 creates security domains, including central SD 804, and third party SD 806, but does not perform any other content management functions. Table 5 (above) illustrates the commands supported by an ISD.

The central SD 804 has Authorized Management privileges (discussed in further detail above with reference to Table 2), and manages the content as instructed by the central TSM 802. In particular, the central SD 804 may securely manage applications, create SP SDs, and perform management operations on applets or applications in the secure element. The central SD 804 is associated with a package 813, the SP SD 809 and the SP SD 810. The SP SDs 809 and 810 are associated with applets 809-1 and 810-1. Table 6 above illustrates the commands supported by a central SD.

As illustrated in FIG. 8, the central TSM 802 manages the central SD 804. That is, the central TSM 802 acts as a secure element manager by controlling the keys of the central SD 804 (and its associated applications), and therefore can use any of its associated privileges (discussed in further detail below with reference to Tables 12.1 and 12.2). Through the central SD 804, the central TSM 802 may load, install, extradite, lock or delete any associated applet or application on the secure element 801. Additionally, the central TSM 802 may create and manage SP SDs.

As further illustrated in FIG. 8, the MNO 807 is associated with and manages MNO SD 815 and the telecommunications applet 816. Therefore, the MNO 807 can use any of the privileges of MNO SD 815. Through the MNO SD 815, the MNO 807 may load, install, extradite, lock or delete any associated applet or application on the secure element 801. Additionally, MNO packages and application or applet instances are loaded and/or created under (i.e., associated with) the MNO SD 815. The MNO 807 can lock or delete any MNO-associated application on the secure element 801 through the MNO SD 815.

As further illustrated in FIG. 8, the third party TSM 808 controls the keys of the third party SD 806 (and its associated applications), and therefore can use any of its associated privileges (discussed in further detail below with reference to Tables 12.1 and 12.2). Through the third party SD 806, the third party TSM 808 may load, install, extradite, lock or delete any associated applet or application. The third party TSM 808 can also create and manage SP SDs that are associated with its respective third party SD. Packages that are associated with the third party TSM (e.g., package 814), are loaded under (i.e., associated with) the third party SD 806. Applets or applications that are associated with the third party TSM 808 (e.g., application 811-1) are instantiated and the instances are created under (i.e., associated with) the third party SD 806. After instantiation, if appropriate, the applets or applications are extradited (i.e., delivered) to their respective SP SDs (e.g., application 811-1 is extradited to the SP SD 811).

Tables 12.1 and 12.2 illustrate the privileges (e.g., Global Platform privileges) assigned to an ISD (e.g., ISD 805), a central SD (e.g., central SD 804), an MDPH SD (e.g., MDPH SD 817), a CA SD (e.g., CA SD 818), a third party SD (e.g., third party SD 806), an MNO SD (e.g., MNO SD 815), an SP SD (e.g., SP SD 809), and an SP SD with Delegated Management (e.g., SP SD 810).

TABLE 12.1

| Privileges | ISD | Central SD | MDPH SD | CA SD | MNO SD |
|---|---|---|---|---|---|
| Security Domain | Yes | Yes | Yes | Yes | Yes |
| DAP Verification | | | | | |
| Delegated Management | | | | | |
| Card Lock | Yes | | | | |
| Card Terminate | Yes | | | | |
| Card Reset | | | | | |
| CVM Management | Yes | | | | |
| Mandated DAP Verification | | | Yes | | |
| Trusted Path | Yes | Yes | | | Yes |
| Authorized Management | Yes | Yes | | | Yes |
| Token Verification | | Yes | | | |
| Global Delete | Yes | | | | |
| Global Lock | Yes | | | | |
| Global Registry | Yes | | | | |
| Final Application | | | | | |
| Global Service | | | | Yes | |
| Receipt Generation | | Yes | | | |

TABLE 12.2

| Privileges | Third Party SD | SP SD | SP SD (with Delegated Mgmt.) |
|---|---|---|---|
| Security Domain | Yes | Yes | Yes |
| DAP Verification | | Optional | Optional |
| Delegated Management | | | Yes |
| Card Lock | | | |
| Card Terminate | | | |
| Card Reset | | | |
| CVM Management | | | |
| Mandated DAP Verification | | | |
| Trusted Path | Yes | Yes | Yes |
| Authorized Management | Yes | | |
| Token Verification | | | |
| Global Delete | | | |
| Global Lock | | | |
| Global Registry | | | |
| Final Application | | | |
| Global Service | | | |
| Receipt Generation | | | |

In an alternative embodiment, one or both of SP SDs 809 and 810 do not have DAP verification privilege.

In another alternative embodiment, one or both of MDPH SD 817 and CA SD 818 are not included in the secure element 801.

H. Computer Readable Medium Implementation

The present invention (e.g., system 100, sequences 200-400, configurations 500-800, or any part(s) or function(s) thereof) can be implemented using hardware, software, or a combination thereof, and can be implemented in one or more mobile device or other processing systems. To the extent that manipulations performed by the present invention were referred to in terms of human operation, no such capability of a human operator is necessary, or desirable in most cases, in any of the operations described herein which form part of the present invention. Rather, the operations described herein are machine operations. Useful machines for performing the operations of the present invention include mobile phones, smartphones, personal digital assistants (PDAs) or similar devices.

Figure 9:
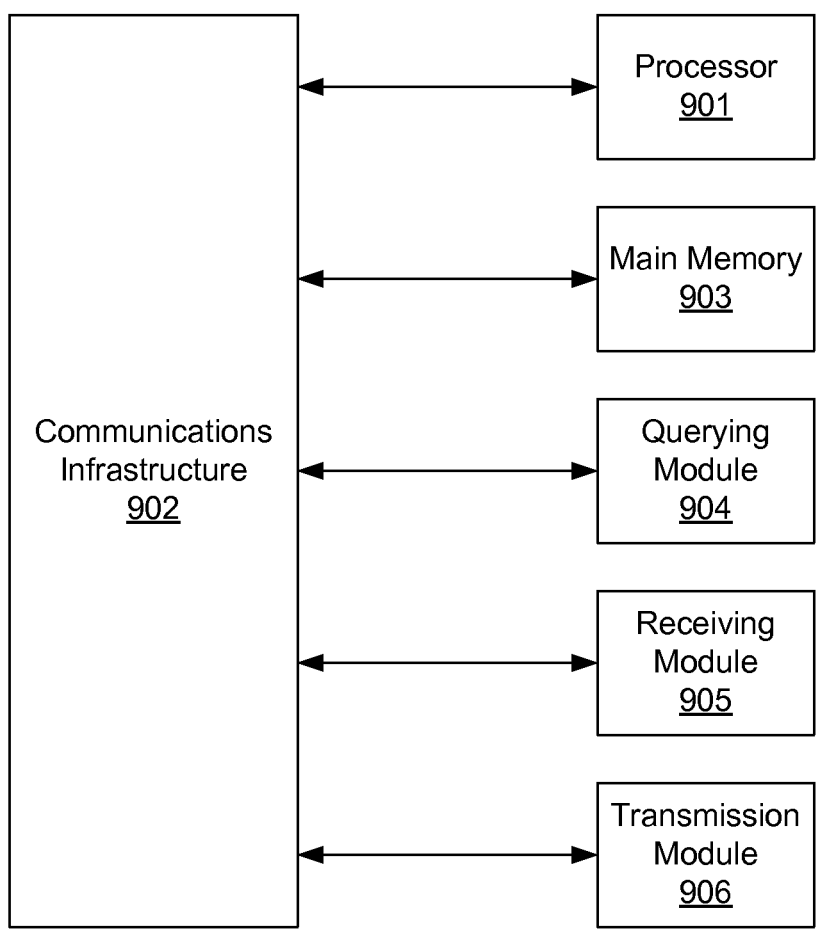
FIG. 9 is a block diagram of an exemplary system useful for implementing the present invention.

In one embodiment, the invention is directed toward one or more systems capable of carrying out the functionality described herein. An example of a system 900 is shown in FIG. 9.

The system 900 includes one or more processors, such as processor 901. The processor 901 is connected to a communication infrastructure 902 (e.g., communication bus, network). Various embodiments are described in terms of this exemplary system. After reading this description, it will become more apparent to a person skilled in the relevant art(s) how to implement the invention using other systems and/or architectures.

The system 900 also includes a main memory 903, which may be a database, or the like.

The system 900 also includes a querying module 904 for querying the main memory 903. Querying a memory (e.g., main memory 903) is discussed in further detail above with reference to FIGS. 2-4.

The system 900 also includes a receiving module 905 for receiving data, such as requests, from other entities over a network. Receiving data, such as requests, is discussed in further detail above with reference to FIGS. 2-4.

The system 900 also includes a transmission module 906 for transmitting data, such as requests and responses, to other entities over a network. Transmitting data, such as requests and responses, is discussed in further detail above with reference to FIGS. 2-4.

Each of modules 904-906 may be implemented using hardware, software or a combination of the two.

The example embodiments described above such as, for example, the systems and procedures depicted in or discussed in connection with FIGS. 1 to 8, or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general purpose digital computers or similar devices.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a non-transitory storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the non-transitory computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures described above.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

I. Renewing a Service

Figure 10:
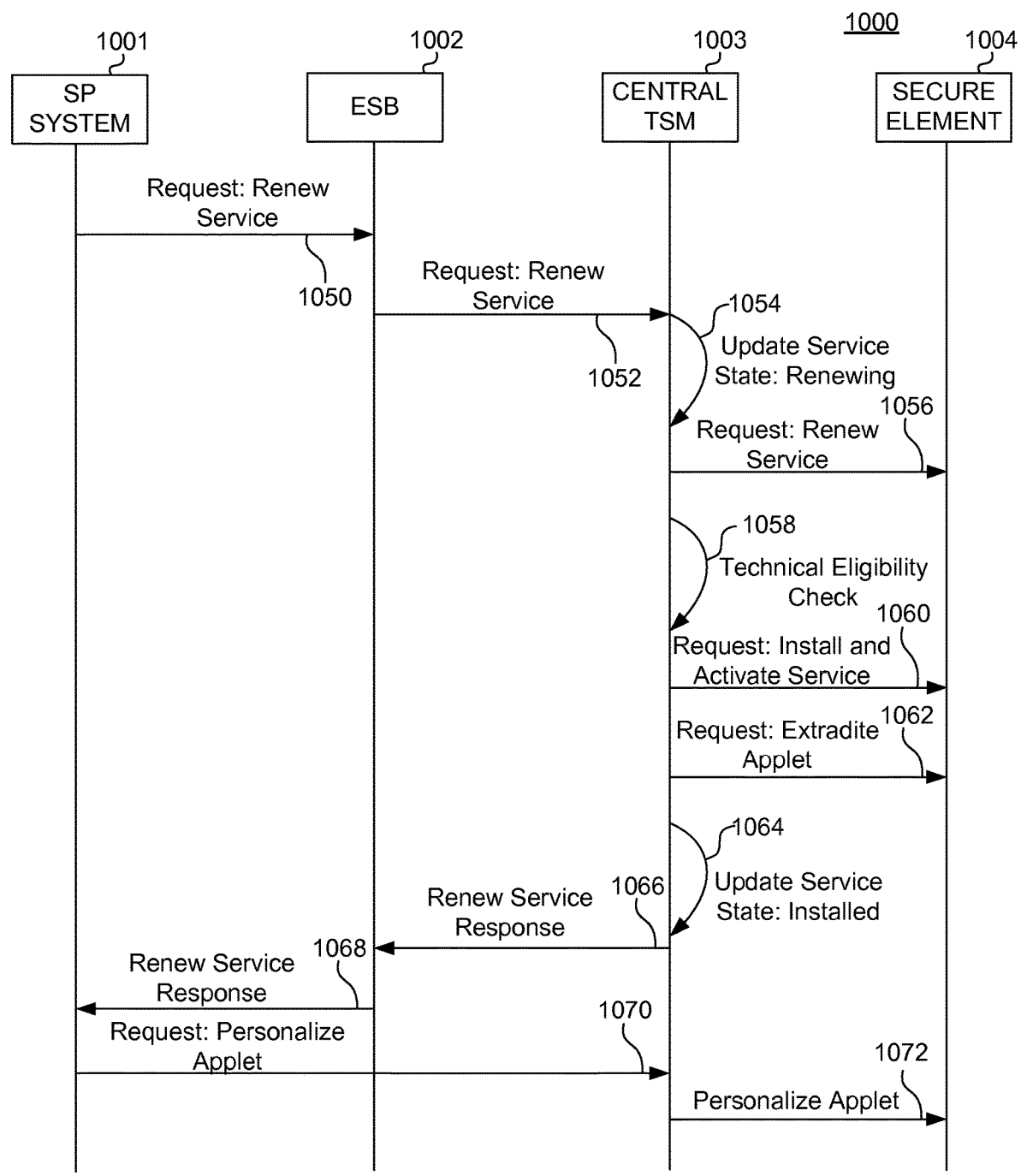
FIG. 10 is a sequence diagram illustrating a sequence for renewing a service according to an exemplary embodiment.

FIG. 10 illustrates a sequence 1000 for renewing a service according to an exemplary embodiment.

As shown in FIG. 10, at step 1050, an SP system 1001 (e.g., FIG. 1, SP TSM 103-1) transmits a request, to an ESB 1002, to renew a service (Request: Renew Service) on a secure element 1004 (e.g., FIG. 1, SE 106a-1). An ESB is used to facilitate interactions between entities including an SP system, central TSM and/or secure element.

In one exemplary embodiment, an SP system may be an infrastructure including one or components. Examples of these components include a TSM (e.g., SP TSM) and middleware. That is, communications to and from an SP system may be processed by one or more of the components that make up an SP system.

A request to renew a service (Request: Renew Service) may be transmitted by an SP system, for example, if the service has expired (i.e., the service has passed a predetermined expiration date associated with the service). The request to renew a service (Request: Renew Service) includes a service qualifier. Optionally, the request to renew a service (Request: Renew Service) may include a service identifier.

The ESB 1002 receives the request transmitted at step 1050 and, in turn, transmits a request (Request: Renew Service) to the central TSM 1003 (e.g., FIG. 1, central TSM 102), at step 1052. The request (Request: Renew Service) includes the service qualifier provided by the SP system 1001 at step 1050. Optionally, the request to renew a service (Request: Renew Service) may include a service identifier.

In turn, at step 1054, the central TSM 1003 updates the state of the service (Update Service State: Renewing) corresponding to the service qualifier received at step 1052 to "renewing." Updating the state of a service generally includes the modification of a service state parameter associated with a service.

At step 1056, the central TSM 1003 removes the service (Request: Remove Service) corresponding to the service qualifier received at step 1052. Removing a service may include deleting the applet instance corresponding to the service being removed, as well as data associated with the applet instance, from the secure element 1004 on which the applet instance is installed. Deleting and/or removing a service from a secure element includes the exchange of one or more commands (e.g., "delete") between a central TSM and secure element, as described above in more detail with reference to FIGS. 5 to 8.

As further illustrated in FIG. 10, once the service has been removed from the secure element 1004, the central TSM 1003 performs a technical eligibility check, at step 1058. A technical eligibility check includes a determination of whether an applet corresponding to a service can be installed (i.e., instantiated) on the secure element 1004. For example, the technical eligibility check may be used to determine whether the secure element 1004 has sufficient memory space to have the applet installed on it.

If the technical eligibility check fails, a notification may be transmitted to the ESB 1002 and/or to the SP system 1001 indicating that an error has occurred. The notification may also indicate the reason for the failure of the technical eligibility check performed at step 1058.

Alternatively, if the technical eligibility check performed at step 1058 is successful, the central TSM 1003 transmits, at step 1060, a request to the secure element 1004 to install (e.g., by creating an instance of an applet) and activate (Request: Install and Activate Service) a service associated with the service qualifier received at step 1052. Installing and activating a service are performed by the exchange of one or more commands (e.g., install, activate) between a central TSM and a secure element, as described above in more detail with reference to FIGS. 5 to 8. Additionally, installing and activating a service are described above in more detail with reference to FIG. 3 (step 394) and FIG. 4 (step 462)

In turn, at step 1062, the central TSM 1003 transmits a request to extradite an instance of an applet (Request: Extradite Applet) to a corresponding SP SD in the secure element 1004. Extraditing an instance of an applet to a SP SD is described above in more detail with reference to FIG. 5. (e.g., the applet 505-1 is extradited to its respective SP SD 505). The corresponding SP SD to extradite the applet is determined based on the service qualifier received at step 1052, and/or, optionally, the service identifier.

The central TSM 1003, in turn, updates the state of the service (Update Service State: Installed) corresponding to the service qualifier received at step 1052 to "installed," at step 1064. At step 1066, the central TSM 1003 transmits a response (Renew Service Response) to the ESB 1002. The response (Renew Service Response) transmitted at step 1066 includes information indicating whether the request transmitted by the ESB 1002 at step 1052 succeeded or failed. That is, the response (Renew Service Response) informs the ESB 1002 whether the service was successfully renewed.

As further illustrated in FIG. 10, the ESB 1002 transmits, at step 1068, a response (Renew Service Response) to the SP system 1001 including information indicating whether the request transmitted by the SP system 1001 at step 1050 succeeded or failed. This response transmitted by the ESB 1002 to the SP system 1001 is based on information received by the ESB 1002 from the central TSM 1003 at step 1066.

In turn, at step 1070, the SP system 1001 transmits a request (Request: Personalize Applet) to the central TSM 1003 to personalize the applet installed (i.e., instantiated) on the secure element 1004. The request (Request: Personalize Applet) includes commands and data to transmit to and/or upload to the secure element 1004. The data includes sensitive data including account and customer information. At step 1072, the central TSM 1003 receives the request (Request: Personalize Applet) and communicates with the secure element 1004 to personalize the applet (Personalize Applet). Applet personalization is described above in more detail with reference to steps 382, 384 and 386 of FIG. 3.

In an alternative embodiment, a request to renew a service (e.g, Request: Renew Service) is transmitted by the SP system 1001 to the central TSM 1003 without communicating with the ESB 1002. A response to the request to renew a service (e.g., Renew Service Response) can also be transmitted to the SP system 1001 by the central TSM 1003 without communicating with the ESB 1002.

What is claimed is:

1. A computer-implemented method to interface with secure elements, comprising:

receiving, by a central trusted service manager computing system, a request to delete one or more services stored on a secure element, the request including a service qualifier identifying a particular instance of the one or more services to be deleted from the secure element;

determining, by the central trusted service manager computing system, one or more commands executable by the secure element to delete the particular instance of the one or more services; and transmitting, by the central trusted service manager computing system to a central security domain of the secure element, a request to execute the one or more commands to delete from the secure element data associated with the service qualifier identifying the particular instance of the one or more services.

2. The computer-implemented method of claim 1, wherein the one or more commands are configured for execution by the secure element to:
   identify data corresponding to each of the one or more services, the identified data comprising one or more unique numbers each identifying a different payment account, and
   delete, via the central security domain, the one or more unique numbers each identifying the different payment account from the secure element.

3. The computer-implemented method of claim 1, further comprising:
   determining, by the central trusted service manager computing system, that the secure element corresponds to the request to delete the one or more services stored on the secure element.

4. The computer-implemented method of claim 1, further comprising:
   determining, by the central trusted service manager computing system, which commands are executable by the secure element to delete the data associated with the one or more services from the secure element.

5. The computer-implemented method of claim 1, wherein the secure element comprises one or more instances of an application associated with each of the one or more services on the secure element.

6. The computer-implemented method of claim 5, wherein each instance of the application is associated with a different service provider computing system.

7. The computer-implemented method of claim 1, wherein the one or more commands are configured for execution by the secure element to:
   lock an application associated with the data.

8. A system to interface with secure elements, comprising:
   one or more computing devices comprising at least one memory and a processor communicatively coupled to the at least one memory, wherein the processor executes application code instructions that are stored in the at least one memory to cause the one or more computing devices to:
      receive, by a central trusted service manager computing system, a request to delete one or more services stored on a secure element, the request including a service qualifier identifying a particular instance of the one or more services to be deleted from the secure element;
      determine, by the central trusted service manager computing system, one or more commands executable by the secure element to delete the particular instance of the one or more services; and
      transmit, by the central trusted service manager computing system to a central security domain of the secure element, a request to execute the one or more commands to delete from the secure element data associated with the service qualifier identifying the particular instance of the one or more services.

9. The system of claim 8, wherein the one or more commands are configured for execution by the secure element to:
   identify data corresponding to each of the one or more services, the identified data comprising one or more unique numbers each identifying a different payment account, and
   delete, via the central security domain, the one or more unique numbers each identifying the different payment account from the secure element.

10. The system of claim 8, wherein the operations further comprise:
    determining, by the central trusted service manager computing system, that the secure element corresponds to the request to delete the one or more services stored on the secure element.

11. The system of claim 8, wherein the operations further comprise:
    determining, by the central trusted service manager computing system, which commands are executable by the secure element to delete the data associated with the one or more services from the secure element.

12. The system of claim 8, wherein the secure element comprises one or more instances of an application associated with each of the one or more services on the secure element.

13. The system of claim 12, wherein each instance of the application is associated with a different service provider computing system.

14. The system of claim 8, wherein the one or more commands are configured for execution by the secure element to:
    lock an application associated with the data.

15. One or more non-transitory computer readable media that collectively store instructions that when executed by one or more processors cause the one or more processors to perform operations, the operations comprising:
    receiving, by a central trusted service manager computing system, a request to delete one or more services stored on a secure element, the request including a service qualifier identifying a particular instance of the one or more services to be deleted from the secure element;
    determining, by the central trusted service manager computing system, one or more commands executable by the secure element to delete the particular instance of the one or more services; and
    transmitting, by the central trusted service manager computing system to a central security domain of the secure element, a request to execute the one or more commands to delete from the secure element data associated with the service qualifier identifying the particular instance of the one or more services.

16. The one or more non-transitory computer readable media of claim 15, wherein the one or more commands are configured for execution by the secure element to:
    identify data corresponding to each of the one or more services, the identified data comprising one or more unique numbers each identifying a different payment account, and
    delete, via the central security domain, the one or more unique numbers each identifying the different payment account from the secure element.

17. The one or more non-transitory computer readable media of claim 15, further comprising:
    determining, by the central trusted service manager computing system, that the secure element corresponds to the request to delete the one or more services stored on the secure element.

18. The one or more non-transitory computer readable media of claim 15, wherein the operations further comprise:
    determining, by the central trusted service manager computing system, which commands are executable by the secure element to delete the data associated with the one or more services from the secure element.

19. The one or more non-transitory computer readable media of claim 15, wherein the secure element comprises one or more instances of an application associated with each of the one or more services on the secure element.

20. The one or more non-transitory computer readable media of claim 15, wherein the one or more commands are configured for execution by the secure element to:
  lock an application associated with the data.

\* \* \* \* \*